United States Patent
Yan et al.

(10) Patent No.: US 8,942,772 B2
(45) Date of Patent: Jan. 27, 2015

(54) SYSTEMS, APPARATUS, AND METHODS FOR ARBITRATION OF ANTENNA SWITCH CONFIGURATION AMONG DIFFERENT CLIENTS

(71) Applicant: QUALCOMM Incorporated, San Diego, CA (US)

(72) Inventors: Hongbo Yan, Vista, CA (US); Daniel Fred Filipovic, Solana Beach, CA (US)

(73) Assignee: QUALCOMM Incorporated, San Diego, CA (US)

(*) Notice: Subject to any disclaimer, the term of this patent is extended or adjusted under 35 U.S.C. 154(b) by 83 days.

(21) Appl. No.: 13/841,425

(22) Filed: Mar. 15, 2013

(65) Prior Publication Data

US 2013/0310045 A1 Nov. 21, 2013

Related U.S. Application Data

(60) Provisional application No. 61/649,704, filed on May 21, 2012, provisional application No. 61/716,582, (Continued)

(51) Int. Cl.
*H04B 1/38* (2006.01)
*H04B 15/00* (2006.01)
(Continued)

(52) U.S. Cl.
CPC ............. *H01Q 3/24* (2013.01); *H04W 24/02* (2013.01); *H04B 7/0404* (2013.01);
(Continued)

(58) Field of Classification Search
CPC .......... H01Q 3/24; H01B 1/44; H01B 7/0404; H01B 7/0608; H01B 7/0814; H04W 24/02; H04W 36/14; H04W 36/30; H04W 72/085; H04W 88/06
USPC ................ 455/73, 90.2, 62, 63.4, 552.1, 437, 455/562.1, 575.7
See application file for complete search history.

(56) References Cited

U.S. PATENT DOCUMENTS 5,481,571 A 1/1996 Balachandran et al.
5,530,926 A 6/1996 Rozanski
(Continued)

FOREIGN PATENT DOCUMENTS

EP 746118 A1 12/1996
EP 1175021 A2 1/2002
(Continued)

OTHER PUBLICATIONS

Chapter II Demand & Response Under PCT Article 34—The International Preliminary Examining Authority; Feb. 28, 2014; (PCT/US2013/041883).

(Continued)

*Primary Examiner* — Opiribo Georgewill
(74) *Attorney, Agent, or Firm* — QUALCOMM IP Department; James Hunt Yancey, Jr.

(57) ABSTRACT

This disclosure provides systems, methods, and apparatus for antenna selection for different radio access technologies. An apparatus can include a plurality of antennas and a plurality of radio access technology modules each configured to communicate according to a different radio access technology. The apparatus further includes a controller configured to switch communication circuits of each of the radio access technology modules to communicate via a corresponding one or more of the plurality of antennas. The apparatus further includes a switching manager configured to manage a plurality of switch configurations each defining a mapping between each of the radio access technology modules and the antennas. The switching manager is further configured to store a switch configuration used for a first radio access technology module and cause the controller to maintain the switch configuration in place in response to a network handover. Other aspects, embodiments, and features are also claimed and described.

40 Claims, 18 Drawing Sheets

Related U.S. Application Data filed on Oct. 21, 2012, provisional application No. 61/734,276, filed on Dec. 6, 2012, provisional application No. 61/737,715, filed on Dec. 14, 2012, provisional application No. 61/716,586, filed on Oct. 21, 2012, provisional application No. 61/716,599, filed on Oct. 21, 2012, provisional application No. 61/716,902, filed on Oct. 22, 2012, provisional application No. 61/736,541, filed on Dec. 12, 2012.

(51) Int. Cl.

| | | |
|---|---|---|
| *H04M 1/00* | (2006.01) | |
| *H04W 24/00* | (2009.01) | |
| *H01Q 3/24* | (2006.01) | |
| *H04W 24/02* | (2009.01) | |
| *H04B 7/04* | (2006.01) | |
| *H04W 72/08* | (2009.01) | |
| *H04W 76/02* | (2009.01) | |
| *H04W 36/30* | (2009.01) | |
| *H04B 1/44* | (2006.01) | |
| *H04W 36/14* | (2009.01) | |
| *H04W 88/06* | (2009.01) | |
| *H04B 7/06* | (2006.01) | |
| *H04B 7/08* | (2006.01) | |

(52) U.S. Cl.
CPC .......... *H04W 72/085* (2013.01); *H04W 76/027* (2013.01); *H04W 36/30* (2013.01); *H04B 1/44* (2013.01); *H04W 36/14* (2013.01); *H04W 88/06* (2013.01); *H04B 7/0608* (2013.01); *H04B 7/0814* (2013.01)
USPC ........... 455/575.7; 455/73; 455/90.2; 455/62; 455/63.4; 455/552.1; 455/437; 455/562.1

(56) References Cited

U.S. PATENT DOCUMENTS

| | | |
|---|---|---|
| 5,541,963 A | 7/1996 | Nakagoshi |
| 5,940,454 A | 8/1999 | McNicol et al. |
| 6,029,057 A | 2/2000 | Paatelma et al. |
| 6,032,033 A | 2/2000 | Morris et al. |
| 6,035,183 A | 3/2000 | Todd et al. |
| 6,360,088 B1 | 3/2002 | Shi et al. |
| 6,947,716 B2 | 9/2005 | Ono |
| 6,961,545 B2 | 11/2005 | Tehrani et al. |
| 7,295,528 B2 | 11/2007 | Ibrahim et al. |
| 7,447,171 B2 | 11/2008 | Smallcomb et al. |
| 7,471,702 B2 | 12/2008 | Laroia et al. |
| 7,492,842 B2 | 2/2009 | Yen et al. |
| 7,499,691 B1 | 3/2009 | Dunn et al. |
| 7,502,592 B2 | 3/2009 | Yamamoto et al. |
| 7,546,404 B2 | 6/2009 | Yeh et al. |
| 7,907,573 B2 | 3/2011 | Lee et al. |
| 7,991,429 B2 | 8/2011 | Chiu |
| 8,009,096 B2 | 8/2011 | Harel et al. |
| 8,014,817 B2 | 9/2011 | Suzuki et al. |
| 8,085,734 B2 | 12/2011 | Faber |
| 8,144,821 B2 | 3/2012 | Hutchison et al. |
| 8,159,399 B2 | 4/2012 | Dorsey et al. |
| 8,213,344 B2 | 7/2012 | Zhu et al. |
| 8,244,944 B1 | 8/2012 | Wong et al. |
| 8,301,192 B2 | 10/2012 | Kakitsu et al. |
| 8,417,205 B2 | 4/2013 | Tang et al. |
| 8,463,214 B2 | 6/2013 | Yen et al. |
| 8,600,427 B2 | 12/2013 | Ibrahim et al. |
| 8,615,270 B2 | 12/2013 | Ibrahim et al. |
| 8,755,359 B2 | 6/2014 | Faber |
| 2002/0086648 A1 | 7/2002 | Wilhelmsson et al. |
| 2002/0118724 A1 | 8/2002 | Kishimoto et al. |
| 2002/0126640 A1 | 9/2002 | Komatsu |
| 2004/0029619 A1 | 2/2004 | Liang et al. |
| 2004/0229650 A1 | 11/2004 | Fitton et al. |
| 2005/0059431 A1 | 3/2005 | Matsui et al. |
| 2005/0266903 A1 | 12/2005 | Masaki |
| 2006/0073829 A1 | 4/2006 | Cho et al. |
| 2006/0276132 A1 | 12/2006 | Sheng-Fuh et al. |
| 2007/0032255 A1 | 2/2007 | Koo et al. |
| 2007/0066244 A1 | 3/2007 | Kao et al. |
| 2007/0178839 A1 | 8/2007 | Rezvani et al. |
| 2007/0238496 A1 | 10/2007 | Chung et al. |
| 2008/0043671 A1 | 2/2008 | Moon et al. |
| 2008/0102760 A1* | 5/2008 | McConnell et al. ............ 455/73 |
| 2008/0123610 A1 | 5/2008 | Desai et al. |
| 2008/0240280 A1 | 10/2008 | Li |
| 2008/0311871 A1 | 12/2008 | Qi et al. |
| 2008/0316913 A1 | 12/2008 | Kim et al. |
| 2009/0124290 A1 | 5/2009 | Tao et al. |
| 2009/0137206 A1 | 5/2009 | Sherman et al. |
| 2009/0180451 A1 | 7/2009 | Alpert et al. |
| 2009/0258622 A1 | 10/2009 | Ruijter |
| 2009/0258627 A1 | 10/2009 | Hanusch et al. |
| 2010/0022192 A1 | 1/2010 | Knudsen et al. |
| 2010/0041355 A1 | 2/2010 | Laroia et al. |
| 2010/0054210 A1 | 3/2010 | Ostergren |
| 2010/0120466 A1 | 5/2010 | Li |
| 2010/0172426 A1 | 7/2010 | Chang |
| 2010/0184459 A1 | 7/2010 | Mori |
| 2010/0215111 A1 | 8/2010 | Filipovic et al. |
| 2010/0246725 A1 | 9/2010 | Okuyama et al. |
| 2010/0296419 A1 | 11/2010 | Kim et al. |
| 2011/0103442 A1 | 5/2011 | Nakayauchi et al. |
| 2011/0250926 A1 | 10/2011 | Wietfeldt et al. |
| 2011/0292786 A1 | 12/2011 | Haessler et al. |
| 2012/0008510 A1 | 1/2012 | Cai et al. |
| 2012/0027112 A1 | 2/2012 | Jiang et al. |
| 2012/0115553 A1 | 5/2012 | Mahe et al. |
| 2012/0142291 A1 | 6/2012 | Rath et al. |
| 2012/0195224 A1 | 8/2012 | Kazmi et al. |
| 2012/0202555 A1 | 8/2012 | Bergman et al. |
| 2012/0207045 A1 | 8/2012 | Pelletier et al. |
| 2012/0244895 A1 | 9/2012 | Thomas et al. |
| 2012/0281553 A1 | 11/2012 | Mujtaba et al. |
| 2012/0282982 A1 | 11/2012 | Mujtaba et al. |
| 2012/0320803 A1 | 12/2012 | Skarp |
| 2013/0005278 A1 | 1/2013 | Black et al. |
| 2013/0017797 A1 | 1/2013 | Ramasamy et al. |
| 2013/0023265 A1 | 1/2013 | Swaminathan et al. |
| 2013/0033996 A1 | 2/2013 | Song et al. |
| 2013/0035051 A1 | 2/2013 | Mujtaba et al. |
| 2013/0040671 A1 | 2/2013 | Zawaideh et al. |
| 2013/0267181 A1 | 10/2013 | Ayatollahi et al. |
| 2013/0307727 A1 | 11/2013 | He et al. |
| 2013/0308476 A1 | 11/2013 | He et al. |
| 2013/0308477 A1 | 11/2013 | He et al. |
| 2013/0308478 A1 | 11/2013 | He et al. |
| 2013/0308554 A1 | 11/2013 | Ngai et al. |
| 2013/0308561 A1 | 11/2013 | He et al. |
| 2013/0308562 A1 | 11/2013 | Matin et al. |
| 2013/0308608 A1 | 11/2013 | Hu et al. |
| 2013/0309981 A1 | 11/2013 | Ngai et al. |
| 2013/0309982 A1 | 11/2013 | Yan et al. |
| 2013/0310109 A1 | 11/2013 | Filipovic et al. |

FOREIGN PATENT DOCUMENTS

| | | |
|---|---|---|
| EP | 1432067 A2 | 6/2004 |
| EP | 1482658 A2 | 12/2004 |
| EP | 1650885 A2 | 4/2006 |
| EP | 2139125 A1 | 12/2009 |
| EP | 2234276 A2 | 9/2010 |
| WO | WO-9819402 A1 | 5/1998 |
| WO | WO-0159945 A1 | 8/2001 |
| WO | WO-0241517 A2 | 5/2002 |
| WO | WO-02082688 A1 | 10/2002 |
| WO | WO-03007502 A1 | 1/2003 |
| WO | WO-2005039073 | 4/2005 |
| WO | 2007058494 A1 | 5/2007 |
| WO | WO-2009098614 A2 | 8/2009 |
| WO | 2010096710 A2 | 8/2010 |

(56) References Cited

FOREIGN PATENT DOCUMENTS

| WO | 2011084715 A1 | 7/2011 |
| WO | WO-2011084717 A1 | 7/2011 |
| WO | 2012011077 A1 | 1/2012 |

OTHER PUBLICATIONS

Heath R W et al., "Multimode Antenna Selection for Spatial Multiplexing Systems With Linear Receivers", IEEE Transactions on Signal Processing, IEEE Service Center, New York, NY, US, vol. 53, No. 8, Aug. 1, 2005, pp. 3042-3056, XP011136488, ISSN: 1053-587X, DOI: DOI:10.1109/TSP.2005.851109.

International Search Report and Written Opinion—PCT/US2013/041892—ISA/EPO—Jul. 30, 2013.

Chapter II Demand and Article 34 Amendments with Response to Written Opinion; International Searching Authority, Jan. 3, 2014, PCT/US2013/041895, 29 pages.

\* cited by examiner

SYSTEMS, APPARATUS, AND METHODS FOR ARBITRATION OF ANTENNA SWITCH CONFIGURATION AMONG DIFFERENT CLIENTS

CROSS REFERENCE TO RELATED APPLICATIONS

The present Application for Patent claims priority to and the benefit of U.S. Provisional Application Numbers: (a) 61/649,704, filed 21 May 2012; (b) 61/716,582, filed 21 Oct. 2012; (c) 61/734,276, filed 6 Dec. 2012; (d) 61/737,715, filed 14 Dec. 2012; (e) 61/716,586, filed 21 Oct. 2012; (f) 61/716,599, filed 21 Oct. 2012; (g) 61/716,902, filed 22 Oct. 2012; and (h) 61/736,541, filed 12 Dec. 2012. All of said applications are assigned to the assignee hereof and are hereby expressly incorporated by reference herein as if fully set forth fully below in their entireties for all applicable purposes.

TECHNICAL FIELD

The technology discussed below relates generally to wireless communications, and more specifically, to antenna selection for different radio access technologies.

BACKGROUND

Wireless communication systems are widely deployed to provide various types of communication content such as voice and data. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP2, 3GPP long-term evolution (LTE), LTE Advanced (LTE-A), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations.

Mobile devices may further simultaneously support communication using multiple radio access technologies. Different radio access technologies may be used to expand the scope of services offered by the communication such as by expanding the geographic region in which the device may operate, as a mobile device moves through different regions supporting different radio access technologies. Furthermore, different radio access technologies may be used to simultaneously allow a user to engage in a variety of different forms of wireless communication activities.

BRIEF SUMMARY OF SOME SAMPLE EMBODIMENTS

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Details of one or more embodiments of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the subject matter described in the disclosure provides an wireless communications apparatus. The apparatus includes a plurality of antennas. The apparatus further includes a plurality of radio access technology modules each configured to wirelessly communicate according to a different radio access technology. Each of the radio access technology modules includes one or more communication circuits configured to transmit or receive wireless communications. The apparatus further includes a controller configured to selectively switch communication circuits of each of the radio access technology modules to transmit or receive wireless communications via a corresponding one or more of the plurality of antennas. The apparatus further includes a switching manager configured to manage a plurality of switch configurations, each of the switch configurations defining a mapping between communications circuits of each of the radio access technology modules and the antennas. The switching manager is further configured to store a switch configuration of the plurality of switch configurations used for a first radio access technology module and cause the controller to maintain the switch configuration in place in response to a network handover.

Another aspect of the subject matter described in the disclosure provides an implementation of a method for wireless communication via a plurality of radio access technology modules. Each of the plurality of radio access technology modules is configured to communicate according to a different radio access technology. The method includes managing a plurality of switch configurations via a switching manager, each of the switch configurations defining a mapping between communication circuits of each of the plurality of radio access technology modules and a plurality of antennas. Managing the plurality of switch configurations further includes storing a switch configuration of the plurality of switch configurations used for a first radio access technology module and maintaining the switch configuration in place in response to a network handover. The method further includes selectively switching the communication circuits of each of the radio access technology modules to transmit or receive wireless communications via a corresponding one or more of the plurality of antennas based on the switch configurations.

Yet another aspect of the subject matter described in the disclosure provides a wireless communications apparatus. The apparatus includes a plurality of means for transmitting or receiving signals. The apparatus further includes a plurality of radio access technology modules, each configured to wirelessly communicate according to a different radio access technology. The apparatus further includes means for selectively switching each of the plurality of radio access technology modules to transmit or receive wireless communications via a corresponding one or more of the means for transmitting or receiving signals. The apparatus further includes means for managing a plurality of switch configurations, each of the switch configurations defining a mapping between each of the plurality of radio access technology modules and the means for transmitting or receiving signals. The means for managing the plurality of switch configurations further including means for storing a switch configuration of the plurality of switch configurations used for a first radio access technology module and means for maintaining the switch configuration in place in response to a network handover.

Another aspect of the subject matter described in the disclosure provides a computer program product comprising a non-transitory computer readable medium encoded thereon with instructions that when executed cause a wireless communications apparatus to perform a method for wireless communication via a plurality of radio access technology modules. Each of the plurality of radio access technology modules are configured to communicate according to a different radio access technology. The method includes managing a plurality of switch configurations via a switching manager, each of the switch configurations defining a mapping between communication circuits of each of the plurality of radio access technology modules and a plurality of antennas. Managing the plurality of switch configurations includes storing a switch configuration of the plurality of switch configurations used for a first radio access technology module and maintaining the switch configuration in place in response to a network handover. The method further includes selectively switching the communication circuits of each of the radio access technology modules to transmit or receive wireless communications via a corresponding one or more of the plurality of antennas based on the switch configurations.

Figure 1:
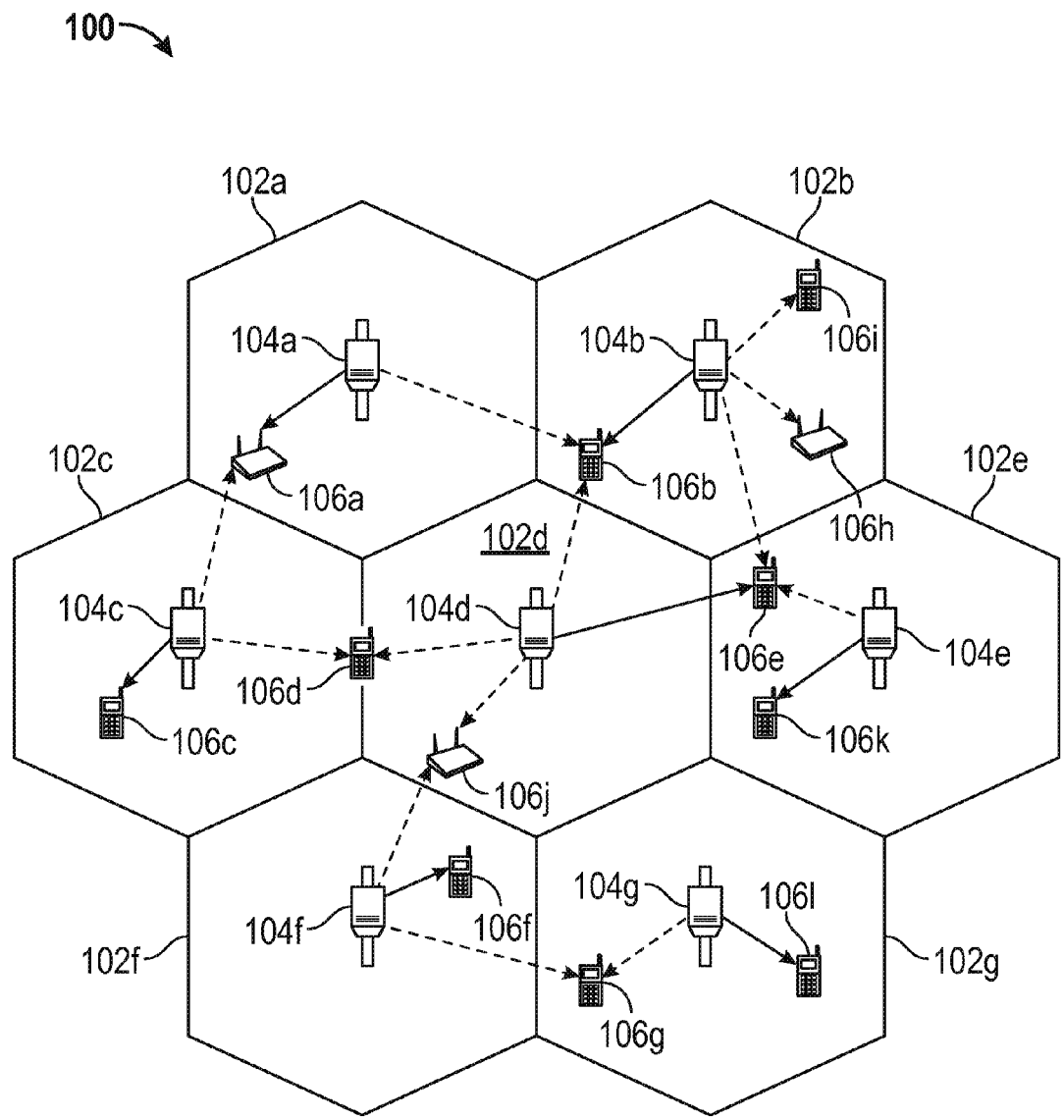
FIG. 1 shows an example of a simplified diagram of a wireless communication system in accordance with some embodiments.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method, or device. Like reference numerals may be used to denote like features throughout the specification and figures.

DETAILED DESCRIPTION

Various aspects of embodiments within the scope of the appended claims are described below. It should be apparent that the aspects described herein may be implemented in a wide variety of forms and that any specific structure and/or function described herein is merely illustrative. Based on the present disclosure a person/one having ordinary skill in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

The word "exemplary" is used herein to mean "serving as an example, instance, or illustration." Any embodiment described herein as "exemplary" is not necessarily to be construed as preferred or advantageous over other embodiments. The following description is presented to enable any person skilled in the art to make and use the invention. Details are set forth in the following description for purpose of explanation. It should be appreciated that one of ordinary skill in the art would realize that the invention may be practiced without the use of these specific details. In other instances, well known structures and processes are not elaborated in order not to obscure the description of the invention with unnecessary details. Thus, the present invention is not intended to be limited by the embodiments shown, but is to be accorded with the widest scope consistent with the principles and features disclosed herein.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (WCDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM", etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS and LTE are described in documents from an organization named "3rd Generation Partnership Project" (3GPP). cdma2000 and EV-DO are described in documents from an organization named "3rd Generation Partnership Project 2" (3GPP2).

The techniques described herein may further be used with various modes associated with different radio access technologies such as simultaneous voice and data modes that allow simultaneously sending and receiving voice and non-voice data. For example, Simultaneous 1X Voice and EV-DO Data (SVDO) and Simultaneous 1X and LTE (SVLTE) modes may be employed in various embodiments.

Single carrier frequency division multiple access (SC-FDMA), which utilizes single carrier modulation and frequency domain equalization is one technique used in a wireless communication system. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

FIG. 1 illustrates an exemplary wireless communication network 100 in accordance with some embodiments. The wireless communication network 100 is configured to support communication between a number of users. The wireless communication network 100 may be divided into one or more cells 102, such as, for example, cells 102a-102g. Communication coverage in cells 102a-102g may be provided by one or more nodes 104 (e.g., base stations), such as, for example, nodes 104a-104g. Each node 104 may provide communication coverage to a corresponding cell 102. The nodes 104 may interact with a plurality of access terminals (ATs), such as, for example, ATs 106a-106l. For ease of reference, ATs 106a-106l may be referred to hereinafter as an access terminal 106.

Each AT 106 may communicate with one or more nodes 104 on a forward link (FL) and/or a reverse link (RL) at a given moment. A FL is a communication link from a node to an AT. A RL is a communication link from an AT to a node. The FL may also be referred to as the downlink. Further, the RL may also be referred to as the uplink. The nodes 104 may be interconnected, for example, by appropriate wired or wireless interfaces and may be able to communicate with each other. Accordingly, each AT 106 may communicate with another AT 106 through one or more nodes 104.

The wireless communication network 100 may provide service over a large geographic region. For example, the cells 102a-102g may cover only a few blocks within a neighborhood or several square miles in a rural environment. In one embodiment, each cell may be further divided into one or more sectors (not shown).

As described above, a node 104 may provide an access terminal (AT) 106 access within its coverage area to another communications network, such as, for example the internet or another cellular network.

An AT 106 may be a wireless communication device (e.g., a mobile phone, router, personal computer, server, etc.) used by a user to send and receive voice or data over a communications network. An access terminal (AT) 106 may also be referred to herein as a user equipment (UE), as a mobile station (MS), or as a terminal device. As shown, ATs 106a, 106h, and 106j comprise routers. ATs 106b-106g, 106i, 106k, and 106l comprise mobile phones. However, each of ATs 106a-106l may comprise any suitable communication device.

An access terminal 106 may be multimode, capable of operating using different radio access technologies (RATs) such as radio access technologies defined by standards such as cdma2000 1x, 1x-EV-DO, LTE, eHRPD, 802.11, and the like. An access terminal 106 may perform a plurality of tasks across various communication systems using different radio access technologies. The communication may be accomplished using a plurality of collocated transmitters or may be communicated using one single transmitter.

Figure 2:
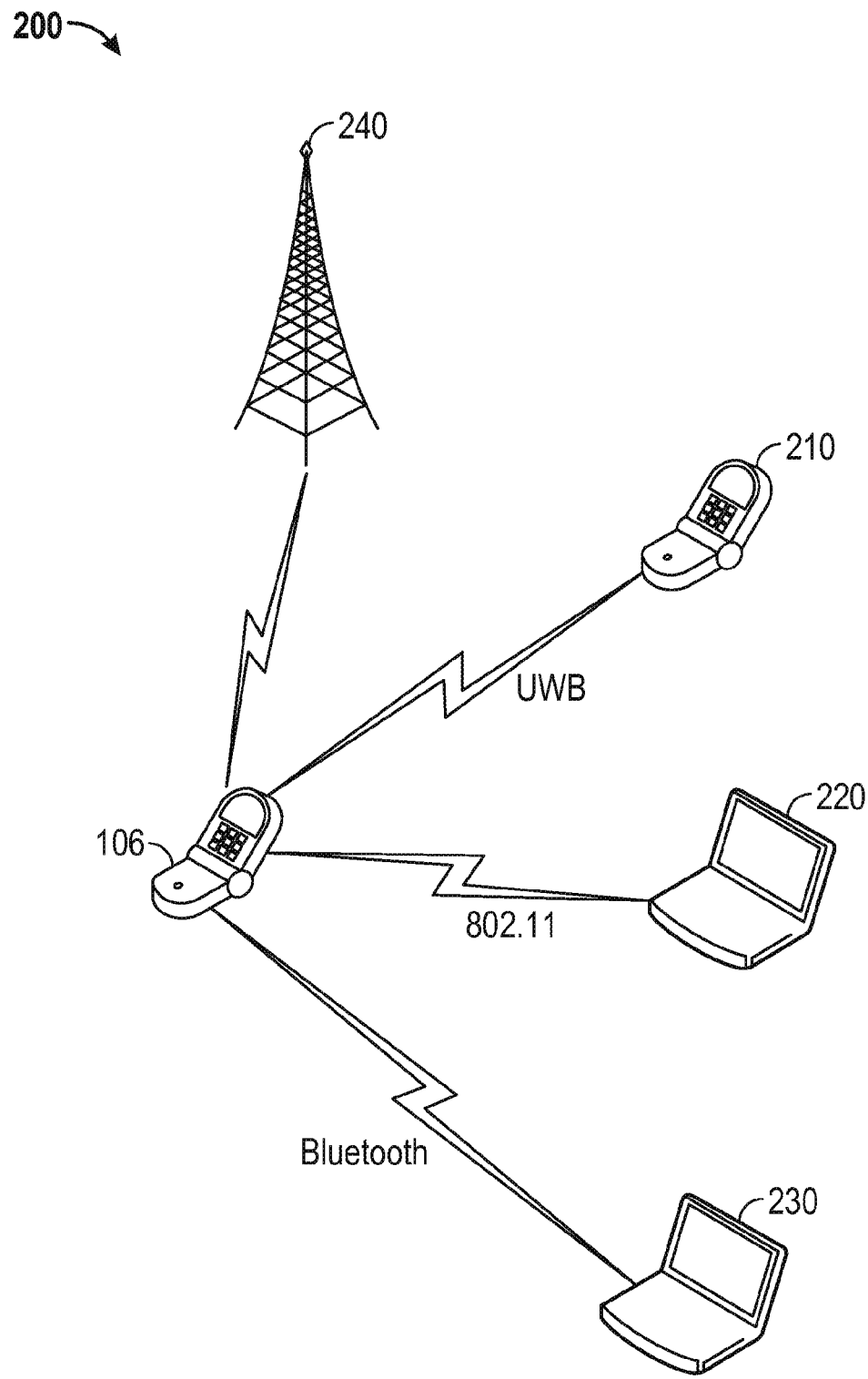
FIG. 2 shows an example of a functional block diagram of an exemplary mobile device operating in a wireless communication network in accordance with some embodiments.

FIG. 2 shows an example of a functional block diagram of an exemplary access terminal 106 operating in a wireless communication network 200 in accordance with some embodiments. The wireless communication network 200 comprises the access terminal 106, a second wireless communications device 210, a third wireless communications device 220, a fourth wireless communications device 230, and a cellular tower 240. The wireless communication network 200 may be configured to support communication between a multitude of devices, such as the wireless communications devices 106a, 210, 220, 230, and tower 240. The mobile wireless communications devices (e.g., 106a, 210, and 220) may comprise, for example, personal computers, PDAs, music players, video players, multimedia players, televisions, electronic game systems, digital cameras, video camcorders, watches, remote controls, headsets, and so on. Access terminal 106 may be simultaneously in communication with each of devices 210, 220, 230, and 240 via one or more transmitters collocated on access terminal 106.

With continuing reference to FIG. 2, the access terminal 106 may communicate with other wireless communications devices (e.g., 210, 220) over a variety of communication channels. The communication channels may comprise Ultra-Wide Band (UWB) channels, Bluetooth channels, 802.11 channels (e.g., 802.11a, 802.11b, 802.11g, and 802.11n), infrared (IR) channels, ZigBee (802.15) channels, or a variety of other channels, as is well known in the art. In one embodiment, the channel may be a UWB channel conforming to the ECMA-368 standard. Other channels would be readily recognized as possible as well.

The wireless communications network 200 may comprise a wireless local area network (WLAN) covering a physical area, like a home, office, or a group of buildings. A WLAN may use standards such as, 802.11 standard (e.g., 802.11g), and/or other standards for wireless communications. A WLAN may use peer-to-peer communication in which the wireless communication devices directly communicate with each other. The wireless communications network 200 may also comprise a wireless personal area network (WPAN), spanning, for example, an area of a few meters. A WPAN may use standards such as infrared, Bluetooth, a WiMedia based UWB standard (e.g., ECMA-368), and ZigBee standards, and/or other standards for wireless communications. A WPAN may use peer-to-peer communication in which the wireless communication devices directly communicate with each other. The wireless communications network 200 may also comprise a wide wireless area network (WWAN). The WWAN may use standards such as cdma2000 1x, 1x-EV-DO, LTE, eHRPD and the like. The access terminal 106 may connect to another network, such as a wireless communications network or the Internet, through network 200. The messages sent across the wireless communications network 200 may comprise information related to various types of communication (e.g., voice, data, multimedia services, etc.) and may be of varied degrees of importance to the user of access terminal 106, as described in greater detail below.

Although the following embodiments may refer to FIG. 1 or 2, one will recognize that they are readily applicable to other communication standards. For example, one embodiment may be applicable in a UMTS communication system. Some embodiments may be applicable in an OFDMA communication system. The communication system 200 may further comprise any type of communication system including, but not limited to, a code division multiple access (CDMA) system, a global system for mobile communication system (GSM), a wideband code division multiple access (WCDMA), and an OFDM system.

Figure 3:
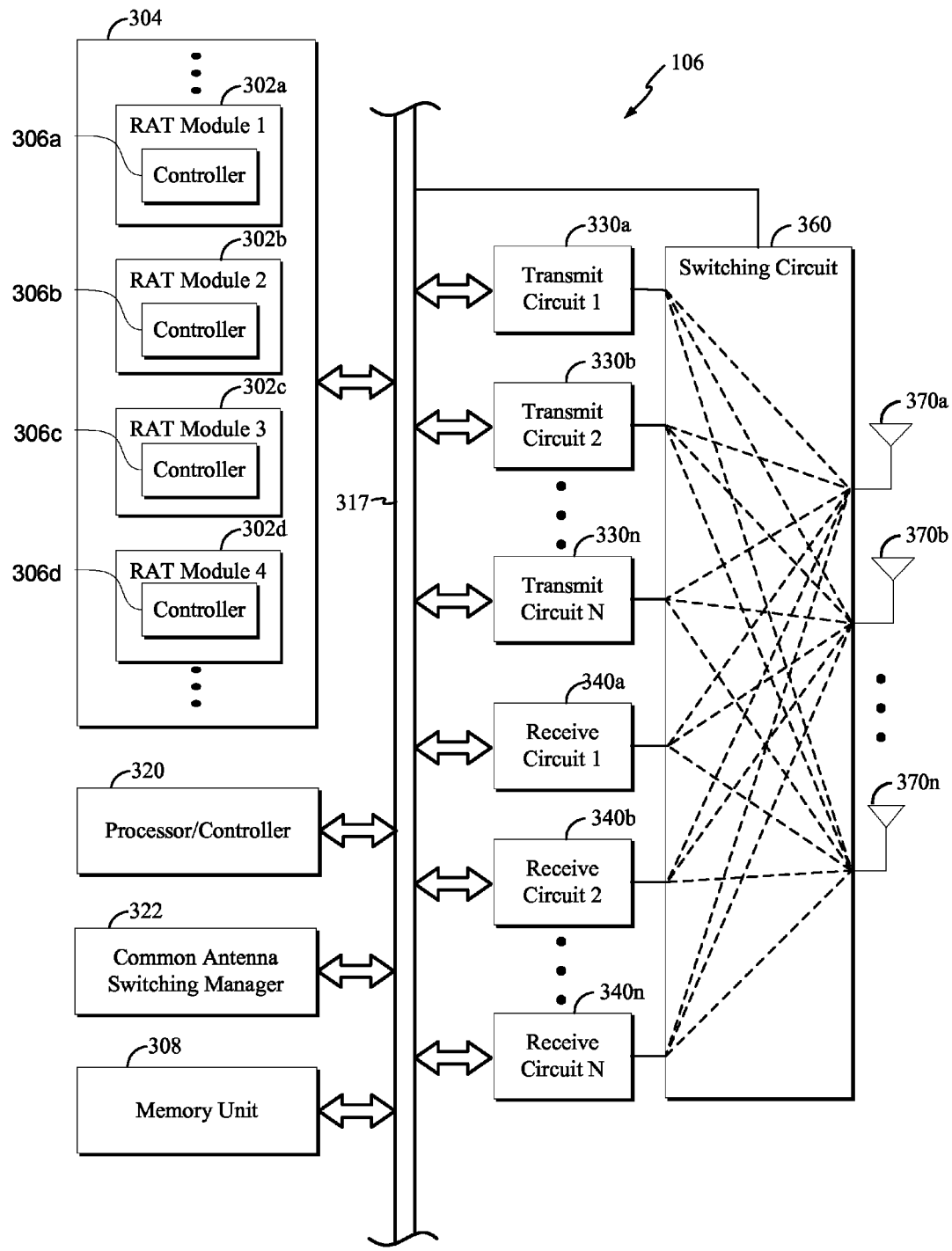
FIG. 3 shows an example of a functional block diagram of an exemplary access terminal shown in FIGS. 1 and 2 in accordance with some embodiments.

FIG. 3 shows an example of a functional block diagram of an exemplary access terminal 106 shown in FIGS. 1 and 2 in accordance with some embodiments. The access terminal 106 may be multimode, capable of operating using different radio access technologies (RATs) such as any of the radio technologies mentioned above with reference to FIGS. 1 and 2. The access terminal 106 is an example of a device that may be configured to implement the various methods described herein. The access terminal 106 may implement any of the devices illustrated in FIGS. 1-2.

The access terminal 106 may include a data bus 317 linking several circuits together. The circuits include a controller/processor 320, a memory unit 308, and RAT circuitry 304 which may include various radio access technology modules such as modules 302a, 302b, 302c, and 302d. The processor/controller 320 may comprise or be a component of a processing system implemented with one or more processors. The processor/controller 320 may be configured as or referred to as an application processor 320 in some embodiments. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

In addition, the processor/controller 320 may be configured to communicate with and control the operation of various modules configured for different radio access technologies (RATs). Each of modules 302a, 302b, 302c, and 302d may implement a specific radio access technology and may each individually include additional memory modules, communication components and functions which are applicable to the radio access technology type implemented by the module. Each module 302a, 302b, 302c, and 302d may further include a controller 306a, 306b, 306c, and 306d which may each also be referred to herein as a modem processor 306a, 306b, 306c, and 306d that may be used to control the operation of each RAT. For ease of reference, controllers 306a, 306b, 306c, and 306d may hereinafter be referred to as a RAT controller 306. Furthermore RAT controllers 306a, 306b, 306c, and 306d may be provided independently of each module 302a, 302b, 302c, and 302d for controlling the modules. In some embodiments, the processor 320 may be configured to perform the functions of the RAT controller 306. Furthermore, each RAT module 302a, 302b, 302c, and 302d may include its own transceiver(s) including antenna(s) (not shown). In addition, each of the RAT modules 302a, 302b, 302c and 302d may include other transmit and receive circuitry (not shown) specific the radio access technology implemented by each RAT module 302a, 302b, 302c and 302d. The RAT modules may implement any of the RAT types discussed above with reference to FIGS. 1-2 or other readily recognizable RAT types. For ease of reference, the RAT modules 302a, 302b, 302c, and 302d may hereinafter be referred to collectively as RAT modules 302.

The access terminal 106 further comprises one or more transmit circuits 330a, 330b, and 330n. Transmit circuits 330a, 330b, and 330n may also be referred to as transmit chains having one or more components configured to transmit wireless communications via an antenna 370a. For example, transmit circuit 330a may include a modulator (not shown), a digital-to-analog (D/A) converter (not shown), an amplifier (not shown) as well as other circuitry for modulating and preparing a wireless communications signal for transmission via an antenna 370a. The RAT modules 302a, 302b, 302c, and 302d may share different components of a transmit circuit 330a. In some cases, the RAT circuitry 304 may include at least a portion of or all of transmit circuits 330a, 330b, and 330n where each RAT module 302a, 302b, 302c, and 302d may include one or more of transmit circuits 330a, 330b, and 330n. In some cases, transmit circuits 330a, 330b, and 330n may be configured to transmit according to a radio access technology associated with one of RAT modules 302a, 302b, 302c, and 302d. However, as indicated above, a transmit circuit 330a is shared by different RAT modules 302a, 302b, 302c, and 302d. In some cases, the access terminal 106 may have one transmit circuit 330a. In other cases, one or more of transmit circuits 330a, 330b, and 330n may be activated or deactivated. In one aspect, the transmit circuits 330a may include components particular to one of the RAT modules 302a, 302b, 302c, and 302d. For example, a RAT module 302a may implement a wireless communications using OFDM, while a second RAT module 302b may implement a wireless communications using CDMA. As such, one transmit circuit 330a may include components configured for OFDM communications while a second transmit circuit 330b may include components configured CDMA communications.

The access terminal 106 further comprises one or more receive circuits 340a, 340b, and 340n. Receive circuits 340a, 340b, and 340n may also be referred to as receive chains having one or more components configured to receive wireless communications via an antenna 370a. For example, receive circuit 340a may include an amplifier (not shown), an analog-to-digital converter (not shown), a demodulator (not shown), as well as other circuitry for receiving and demodulating a wireless communications signal received via an antenna 370a. In some cases, the RAT circuitry 304 may include one or more receive circuits 340a, 340b, and 340n where each RAT module 302a, 302b, 302c, and 302 may include one of receive circuits 340a, 340b, and 340n. The RAT modules 302a, 302b, 302c, and 302d may share different components of a receive circuit 340a. As such, each of receive circuits 340a, 340b, and 340n may be configured to receive according to a radio access technology associated with one of the RAT modules 302a, 302b, 302c, and 302d. However, as indicated above, a receive circuits 340a is shared by different RAT modules 302a, 302b, 302c, and 302d. In some cases, the access terminal 106 may have one receive circuit 340a. In other cases one or more of the receive circuits 340a, 340b, and 340n may be activated or deactivated.

Transmit circuits 330a, 330b, and 330n may process and convert base-band signals to high-frequency (HF) signals. Receive circuits 340a, 340b, and 340n in turn may process and buffer received signals before sending out to the data bus 317. Transmit circuits 330a, 330b, and 330n may process and buffer the data from the data bus 317 before sending out of the access terminal 106.

Each of transmit circuits 330a, 330b, and 330n and receive circuits 340a, 340b, and 340n (or similarly each RAT module 302a, 302b, 302c, and 302d) may be configured to respectively transmit and receive via one of several antennas 370a, 370b, and 370n. Individual transmit circuits 330a, 330b, and 330n and receive circuits 340a, 340b, and 340n may transmit and receive information associated with a different radio access technology via a particular antenna 370a, 370b, or 370n. For example, for simultaneous voice and data modes, one transmit circuit 330a may be used for transmitting voice data via antenna 370a while another transmit circuit 330b may be used for transmitting non-voice data via antenna 370b. Stated another way, a first transmit circuit 330a may be used for transmitting and receiving 1x voice data via antenna 370a while a second transmit circuit 330b may be used for data only (DO) LTE via antenna 370b. The processor/controller 320 directs the multiple transmit circuits 330a, 330b, and 330n and receive circuits 340a, 340b, and 340n for detecting and/or processing of signals from the different frequency bands via antennas 370a, 370b, and 370n. Antennas 370a, 370b, and 370n may be placed in different physical locations within the access terminal 106. For example, antennas 370a, 370b, and 370n may be at opposite (e.g., distal) ends or corners of the access terminal 106 or adjacent to each other. Generally, antennas 370a, 370b, and 370n can be located at similar or distinct places as desired or in accordance with device design.

A switching circuit 360 may be provided to allow a controller 320 to select antennas 370a, 370b, and 370n for which transmit circuits 330a, 330b, and 330n or receive circuits 340a, 340b, and 340n are configured to transmit and receive from. The switching circuit 360 may include circuitry configured to switch M inputs corresponding to transmit circuits 330a, 330b, and 330n and receive circuits 340a, 340b, and 340n to N outputs corresponding to antennas 370a, 370b, and 370n. As shown in FIG. 3, there may be more or less than three transmit circuits 330a, 330b, and 330n, three receive circuits 340a, 340b, and 340n, and three antennas 370a, 370b, and 370n. As one example, the switching circuit 360 may be configured as a crossbar switch or other suitable switching circuitry. The controller 320 may be configured to switch transmit circuits 330a, 330b, and 330n and receive circuits 340a, 340b, and 340n to respectively transmit and receive via any combination of antennas 370a, 370b, and 370n. As noted above, in some implementations, the transmit circuits 330a, 330b, and 330n, and receive circuits 340a, 340b, and 340n are included within RAT modules 302a, 302b, 302c, and 302d. As such, in some implementations, the switching circuit 360 is configured to switch each RAT module 302a, 302b, 302c, and 302d to respectively transmit and receive via any combination of antennas 370a, 370b, and 370n. In some implementations, a RAT module 302a may be determine an appropriate antenna and direct the switching via the switching circuit 360, in other implementations the controller 320 may direct switching, or any combination thereof.

In some embodiments, transmit circuits 330a, 330b, and 330n can be implemented as an external circuit pluggable to the access terminal 106.

The processor/controller 320 performs the function of data management of the data bus 317 and the function of general data processing, including executing the instructional contents of the memory unit 308. The memory unit 308 may include a set of modules and/or instructions. Instructions particular to the process steps of the access terminal 106 as shown and described in the embodiments described below can be coded in the various functions included in the contents of the memory unit 308. In one embodiment, the memory unit 308 is a RAM (Random Access Memory) circuit. Some communication device functions, such as the handoff functions, are software routines, modules, and/or data sets. The memory unit 308 can be tied to another memory circuit (not shown) which either can be of the volatile or nonvolatile type. As an alternative, the memory unit 308 can be made of other circuit types, such as an EEPROM (Electrically Erasable Programmable Read Only Memory), an EPROM (Electrical Programmable Read Only Memory), a ROM (Read Only Memory), an ASIC (Application Specific Integrated Circuit), a magnetic disk, an optical disk, and others well known in the art. In addition, the memory unit 308 can be a combination of ASIC and memory circuitry of the volatile type and/or non-volatile type.

The access terminal 106 further includes a common antenna switching manager 322 configured to manage switch configurations between the RAT modules 302 (and combinations of RAT modules and transmit and receive circuits 330 and 340) and the antennas 370a, 370b, and 370n. For example, each RAT module 302 in conjunction with the transmit or receive circuits 330 and 340 currently used by the RAT module 302 may be selectively coupled to one or more of the antennas 370a, 370b, and 370c (e.g., a RAT module 302a may use just one antenna 370a, may transmit over one antenna 370a and receive over another antenna 370b, may transmit and receive over one antenna 370a and simultaneously receive over another antenna 370b, or any combination thereof). The mapping between a RAT module 302a and one or more antennas 370a, 370b, and 370n may be referred to as a switch configuration. The switch configuration used by the RAT module 302a is stored and managed by the antenna switching manager 322. All switch configurations between different RAT modules 302 and antennas 370a, 370b, and 370n are stored by the antenna switching manager 322. Furthermore, the antenna switching manager 322 may manage all the switch configurations for each of the RAT modules 302 and adjust any of the switch configurations of the RAT modules 302. In addition, the switching manager 322 may be configured to receive performance metrics from each RAT module 302 and further provide each RAT module 302 with other information regarding the availability of antennas 370a, 370b, and 370n. In an aspect, the antenna switching manager 322 is common to all the RAT modules 320 to be able to coordinate and arbitrate the switch configurations among the different RAT modules 302. In this case each RAT module 302 is a "client" of the antenna switching manager 322. The antenna switching manager 322 may be implemented as a circuit and include a controller or other similar circuitry as described above with reference to the controller 320. In some embodiments, all or a portion of the functionality of the antenna switching manager 322 may be implemented by the controller 320. In addition, the antenna switching manager 322 may include a memory (not shown) or may use memory unit 308.

The access terminal 106 may further be configured to detect one or more states or modes of a device according to how the device is being used, handled, and/or positioned. In some cases, the access terminal 106 may also be configured to detect if antenna 370a, 370b, or 370n is blocked.

In this specification and the appended claims, it should be clear that the term "circuitry" is construed as a structural term and not as a functional term. For example, circuitry can be an aggregate of circuit components, such as a multiplicity of integrated circuit components, in the form of processing and/or memory cells, modules, units, blocks, and the like, such as shown and described in FIG. 3.

Although described separately, it is to be appreciated that functional blocks described with respect to the access terminal 106 need not be separate structural elements. For example, the processor 320, the memory unit 308, and RAT modules 302a, 302b, 302c, and 302d may be embodied on a single chip. The processor 320 may additionally, or in the alternative, contain memory, such as processor registers. Similarly, one or more of the functional blocks or portions of the functionality of various blocks may be embodied on a single chip. Alternatively, the functionality of a particular block may be implemented on two or more chips.

Figure 4A:
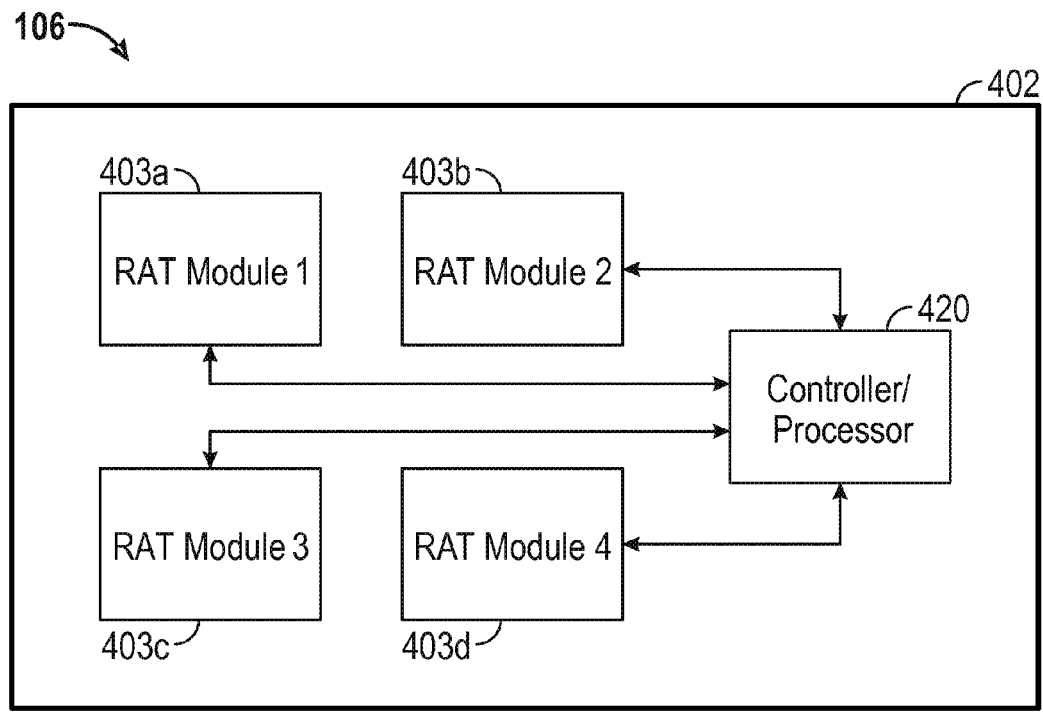
FIGS. 4A and 4B show exemplary configurations for an access terminal having different radio access technology modules, in accordance with some embodiments.
Figure 4B:
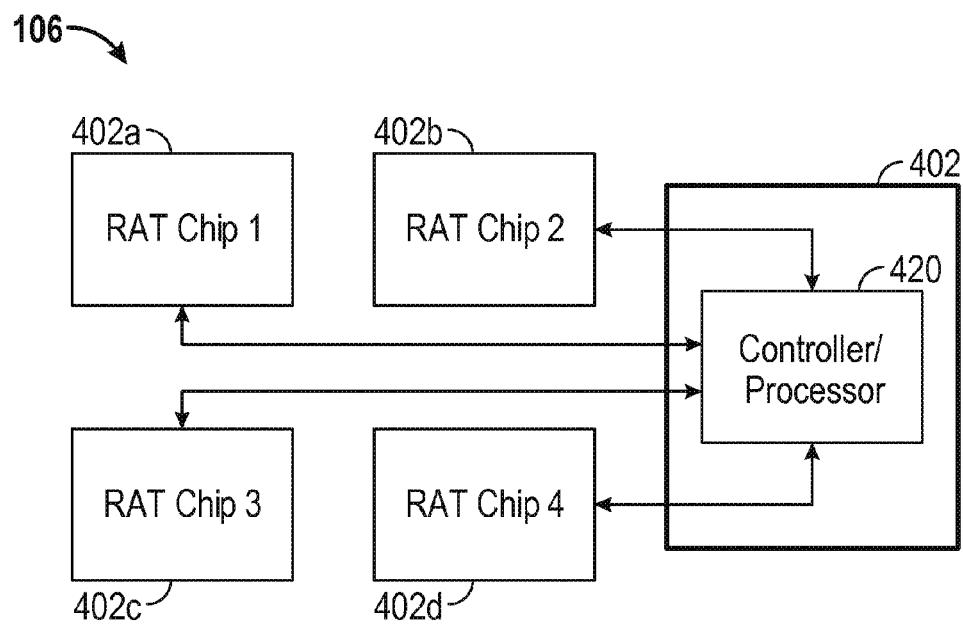

FIGS. 4A and 4B show two exemplary configurations for an access terminal 106 which implements multiple radio access technologies. FIG. 4A shows an exemplary configuration for access terminal 106 showing different radio access technologies implemented on a single chip 402. The chip 402 includes a controller/processor 420. The chip further includes radio access technology modules 403a, 403b, 403c and 403d. Each of the modules 403a, 403b, 403c and 403d may implement a different radio access technology, such as those discussed above with reference to FIGS. 1-2.

FIG. 4B shows an exemplary configuration for access terminal 106 showing different radio access technologies implemented on separate chips. A chip 402 may include a controller/processor 420. Each radio access technology may be implemented on different chips 402a, 402b, 402c and 402d. The processor/controller 420 may control the operation of each of the chips 402a, 402b, 402c and 402d. Each chip 402a, 402b, 402c and 402d may further include individual processors/controllers (not shown), memory modules (not shown), as well as other components applicable to the radio access technology implemented.

Figure 5:
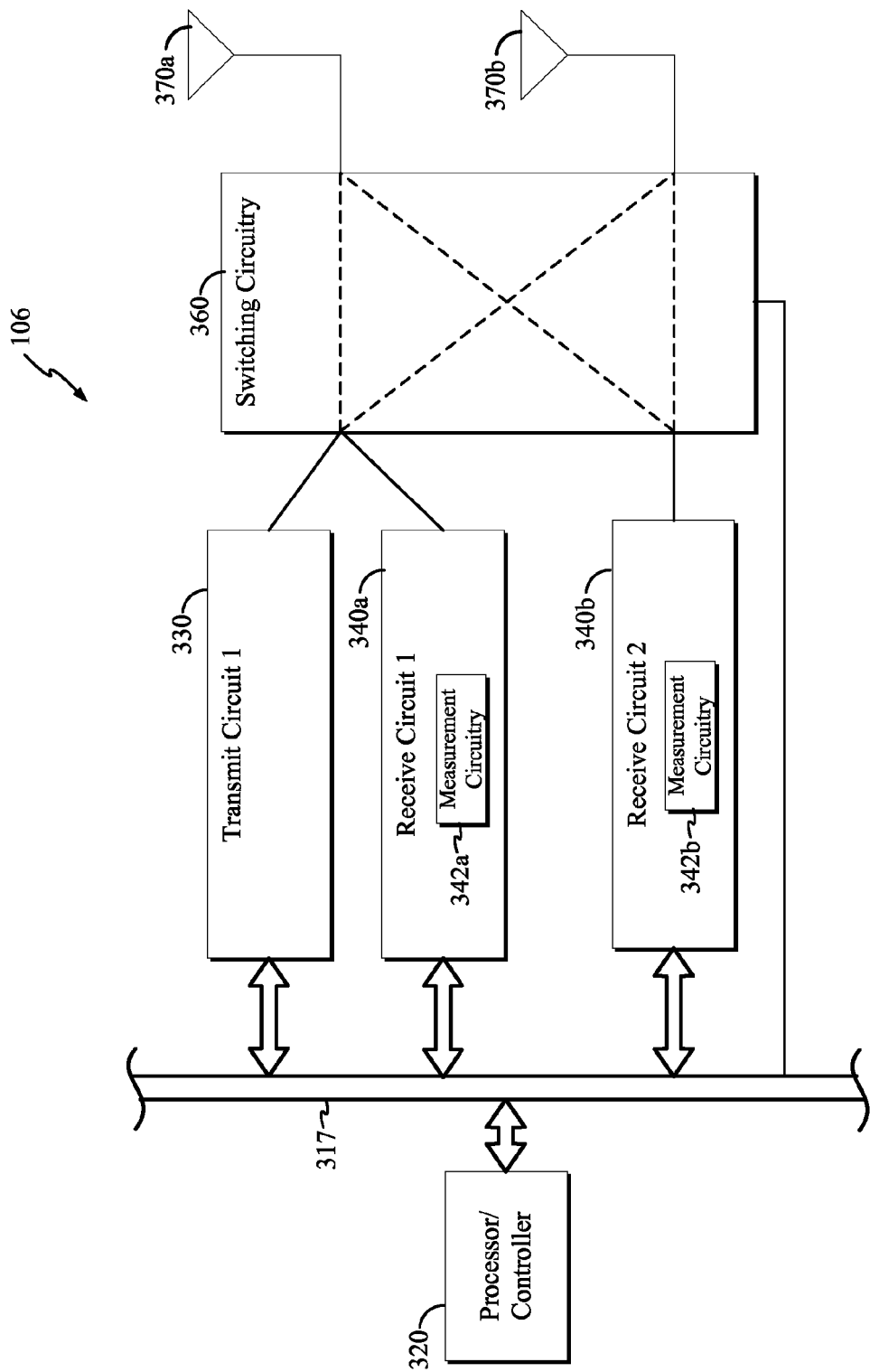
FIG. 5 is a functional block diagram of a portion of the access terminal shown in FIG. 3 in accordance with some embodiments.

FIG. 5 is a functional block diagram of a portion of the access terminal 106 shown in FIG. 3 in accordance with some embodiments. As shown in FIG. 5, the controller 320 may be configured to switch a transmit circuit 330 to communicate via either a first antenna 370a or a second antenna 370b. In addition, a receive circuit 340a may be associated with the transmit circuit 330 in that the receive circuit 340a is configured to communicate via the same antenna 370a or 370b used by the transmit circuit 330. The controller 320 may be configured to switch the transmit circuit 330 and receive circuit 340a to respectively transmit and receive via the first antenna 370a or the second antenna 370b. In addition, a second receive circuit 340b may be configured to communicate via either the antenna 370a or 370b that is not being used for the transmit circuit 330 and the first receive circuit 340a. The first receive circuit 340a and second receive circuit 340b may include measurement circuitry 342a and 342b configured to measure receive power levels. As one example, the measurement circuitry 342a and 342b may be configured to gather receive automatic gain control (AGC) measurements. The access terminal 106 may be configured in a mode such that both receive circuits 340a and 340b are configured to simultaneously receive via either the antenna 370a or 370b. In this case, both receive circuits 340a and 340b may be configured to demodulate the signal and obtain data based on the combination of demodulated data received by both circuits 340a and 340b. In addition, in one implementation, the first receive circuit 340a is configured to receive via one antenna 370a simultaneously while the second receive circuit 340b is configured to receive via the other antenna 370b.

As described above, multiple RAT modules 302a, 302b, 302c, and 302d may simultaneously transmit using multiple antennas 370a, 370b, and 370n. However, the performance of one antenna 370b may be better than another antenna 370b based on any one of a number of factors that may be related to, but not limited to, the arrangements of the antennas on the access terminal 106, the proximity of external objects to the antennas 370a, 370b, and 370c, inherent antenna characteristics, channel conditions, and the like. Furthermore, during operation, certain RAT modules 302a, 302b, 302c, and 302d may have different data transmission priorities or transmit power preferences. Certain aspects of various embodiments described herein are directed to switching between different antennas 370a, 370b, and 370n to improve performance of an access terminal 106. For example, it may be desirable for the transmit circuit 330a transmitting the highest priority data to transmit via the antenna 370a having the best performance. In addition, other transmit circuit power requirements may result in improved performance if a transmit circuit 330a is coupled to the highest performing antenna 370b. As operation of the access terminal 106 may affect antenna performance, it may be desirable to have dynamic systems and methods for coupling transmit circuits 330a, 330b, and 330c to antennas 370a, 370b, and 370n as provided by embodiments described herein.

With reference to FIGS. 3 and 4, certain operating conditions may result in one or more of antennas 370a, 370b, and 370n being de-sensed or otherwise resulting in a reduced performance. For example, the hand of a user may be wrapped around the access terminal 106 effectively blocking one or more of antennas 370a, 370b, and 370n. Or the access terminal 106 may be positioned such that antennas 370a, 370b, and 370n may operate with less than ideal receive and/or transmit conditions. These scenarios may reduce power levels of received signals thus making it more difficult to receive and demodulate signals. Blocking one or more of antennas 370a, 370b, and 370n may also reduce the total signal strength such that transmit circuits 330a, 330b, and 330n may need to increase power levels. However, with respect to increased transmit power levels, an access terminal 106 may be subject to regulatory radio frequency (RF) safety requirements. The access terminal 106 may be required to operate within specific guidelines before entering the market. For example, devices operating near the human body are evaluated to determine the Specific Absorption Rate ("SAR") their electromagnetic waves produce. SAR is the time-rate of electromagnetic energy absorption per unit of mass in a lossy media, and may be expressed as:

$$SAR(r) = \frac{\sigma(r)}{\rho(r)}|E(r)|_{rms}^2 \qquad \text{(Equation 1)}$$

Where E(r) is the exogenous electric field at point r, while σ(r) and ρ(r) are the corresponding equivalent electrical conductivity and mass density, respectively. In one aspect, these safety guidelines may limit the amount of transmit power levels.

Generally, SAR testing evaluates the amount of energy absorbed into the body from such devices with a single or multiple transmitters. Under one requirement, devices operating at distances beyond 20 cm may be evaluated through a maximum permissible exposure ("MPE") calculation or measurement. As such, when an one or more antennas 370a, 370b, and 370n are blocked by a human hand or other body part, the maximum transmit power level allowed to avoid exceeding SAR limits may be significantly reduced.

Other operating conditions depending on the position of the access terminal 106 with respect to a user or other objects may further reduce performance due to antenna blocking. In addition, certain operating modes (e.g., using an access terminal 106 as a hotspot) may require increased power levels which may further impact regulatory limits.

To account for the various operating conditions in addition to other factors, certain aspects of certain embodiments described herein are directed to providing antenna selection diversity to maximize access terminal 106 performance. This may mitigate hand/body blocking and allow for selecting antennas in such a way to meet regulatory limits at the least cost to performance and/or to enable good receive and/or transmit conditions. Furthermore, in one aspect, antenna selection diversity may further be provided to mitigate interference issues.

In accordance with one embodiment, the antenna switching manager 322 may be configured to dynamically determine switch configurations between RAT modules 302 and antennas 370a, 370b, and 370n as will be further described below.

Degradation/interruption to other RAT modules 302 may occur if each RAT module 302 autonomously determines when and how to switch the configuration between itself and the one more antennas 370a, 370b, and 370n. For example, if no coordination exists, one RAT module 302a may choose a switch configuration that could cause interference with another RAT module 302b when both are transmitting or receiving simultaneously. In addition, some RAT modules 302a may be particularly configured to transmit and receive simultaneously (e.g., 1x and LTE) and may use the same or different antennas 370a, 370b, and 370n where degradation or interruption could potentially occur if coordination does not occur.

Certain embodiments described herein are directed to an antenna switching manager 322 that is configured to arbitrate antenna switch configurations among the different RAT modules 302. Furthermore, the antenna switching manager 322 is configured to broadcast when switch configuration changes for different RAT modules 302 occur to allow the RAT modules 302 to respond appropriately. As noted above, the RAT modules 302 may be considered "clients" of the antenna switching manager 322.

While using a particular switch configuration, a network handover may occur. A handover may include a situation where, when a RAT module 302a is operating, the RAT module 302a may perform a handover from one portion of the network (e.g., a first cell) to another portion of the network (e.g., a second cell). In addition, a handover may be when the access terminal 106 switches between RAT modules 302a and 302b so that there is a handover between one RAT module 302a and another RAT module 302b. In an embodiment, the antenna switching manager 322 stores a switch configuration used by the RAT module 302a that is currently in use by the access terminal 106. For example, the access terminal 106 may currently be operating using a RAT module 302a implementing LTE, and the antenna switching manager 322 stores what antennas 370a, 370b, and 370n are being used by the RAT module 302a. The access terminal 106 then perform a handover (e.g., such as a switch to another RAT module 302b implementing, for example, WCDMA, or a handover from one cell to the next). In the case where the RAT module 302a is switched, the antenna switching manager 322 is configured to cause the RAT module 302b to use the stored switch configuration that was previously used for the RAT module 302a. In this way, the second RAT module 302b avoids having to make a switching decision to select particular antennas 370a, 370b, and 370n. Moreover, the previous RAT module 302a may have also made various determinations and/or have knowledge of the best switch configuration that provides the best performance (e.g., which antennas 370a, 370b, and 370b are blocked). By maintaining the switch configuration from the previous RAT module 302a for use with the second RAT module 302b, the best antenna configuration may already be in place. As such, the antenna switching manager 322, by causing the previous switch configuration to be used, may simplify the process for the subsequent RAT module 302b to determine a best case switch configuration. This also applies when a handover is performed by a RAT module 302a switching from one portion of the network to another, where the RAT module 302a may not have to perform additional determinations for which antenna configuration to use.

Figure 6:
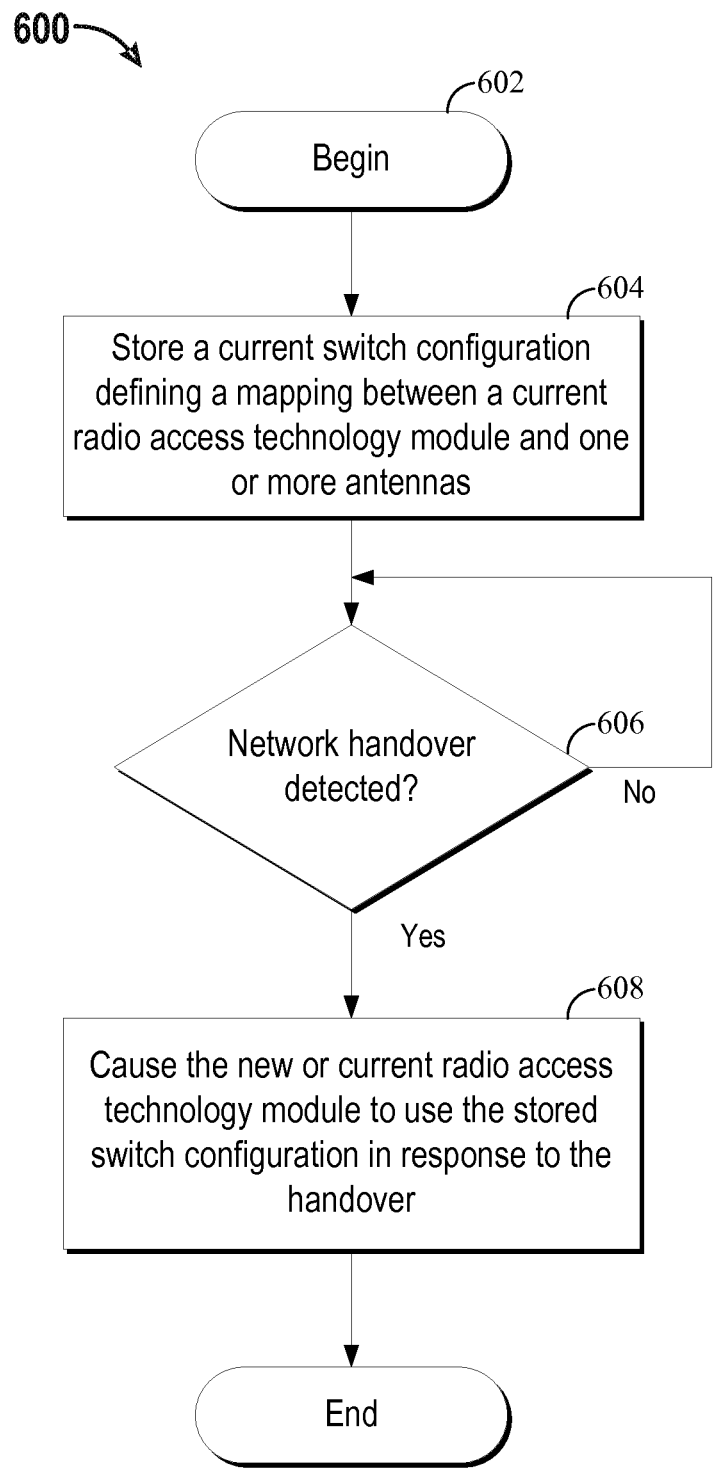
FIG. 6 is a flowchart of an exemplary method for using a common antenna switching manager to manage a switch configuration in response to a network handover, in accordance with some embodiments.

FIG. 6 is a flowchart of an exemplary method 600 for using a common antenna switching manager 322 to manage a switch configuration in response to a network handover, in accordance with an embodiment. The method begins at block 602 where the access terminal 106 is operating using a RAT module 302a. At block 604, a current switch configuration is stored that defines a mapping between the currently used RAT module 302a and one or more antennas 370a, 370b, and 370c. The antenna switching manager 322 may store the current switch configuration. The current switch configuration may be updated and stored by the antenna switching manager 322 each time the RAT module 302a changes the switch configuration or the switch configuration is adjusted by the antenna switching manager 322 for the RAT module 302a. At decision block 606, the antenna switching manager 322 determines whether a network handover is detected. If no handover is detected, the antenna switching manager 322 may update the current switch configuration in the event of any change. If a handover is detected, then at block 608, the antenna switching manager 322 causes the new RAT module 302b or current RAT module 302a (depending on the type of handover) to use the stored switch configuration that was previously used by the first RAT module 302a in response to the handover. In accordance, the RAT modules 302a and 302b do not have to make a switching decision or determine which antennas 370a, 370b, and 370n to use in response to the handover.

In another embodiment, the antenna switching manager 322 aids in managing the switching of multiple RAT modules 302 where one RAT module 302a has a higher priority than another RAT module 302b. The priority may be based on a number of factors such as the type of data needed to be sent, the importance of the information, quality of service (QoS) requirements (e.g., voice may have priority over data), and the like. For example, the antenna switching manager 322 stores a switch configuration that is selected by a first RAT module 302a that has a higher priority (e.g., for sending or receiving data) than a second RAT module 302b. The antenna switching manager 322 sends messages to a lower priority RAT module 302b and other lower priority RAT modules 302 indicating the switch configuration stored and used by the first RAT module 302b to cause the lower priority RAT modules 302 to use the switch configuration of the higher priority RAT module 302a. In this way the antenna switching manager 322 prioritizes switching decisions that different RAT modules 302a make. This may be provided where multiple RAT modules 302 with different priorities are sharing antennas via either time division or simultaneous multiple access (e.g., a RAT module 302a implementing 1x may be active simultaneously with a RAT module 302b implementing LTE). If the higher priority RAT module 302a switches antenna configurations, then it may be desirable for the lower priority other RAT modules 302b to use the same switch configuration. In addition, the switching decision of the lower priority RAT module 302b will not override the switching decision of the higher priority RAT module 302a. As such, the antenna switching manager 322 is configured to disallow changes in a switch configuration requested by the lower priority RAT module 302b. While the priority of the RAT modules 302 has been used as an example, other characteristics of each RAT module 302 may be used in accordance with this embodiment. For example, the antenna switching manager 322 may store the switch configuration selected by a first RAT module 302a and cause other RAT modules 302 to use the same switch configuration selected by the first RAT module 302a based on other characteristics and comparisons between the RAT modules 302. This allows the antenna switching manager 322 to ensure that one RAT module 302b does not override the switch configuration selection of another RAT module 302a for any reason that the selection by the RAT module 302a should take precedent over the other RAT module 302b.

Figure 7:
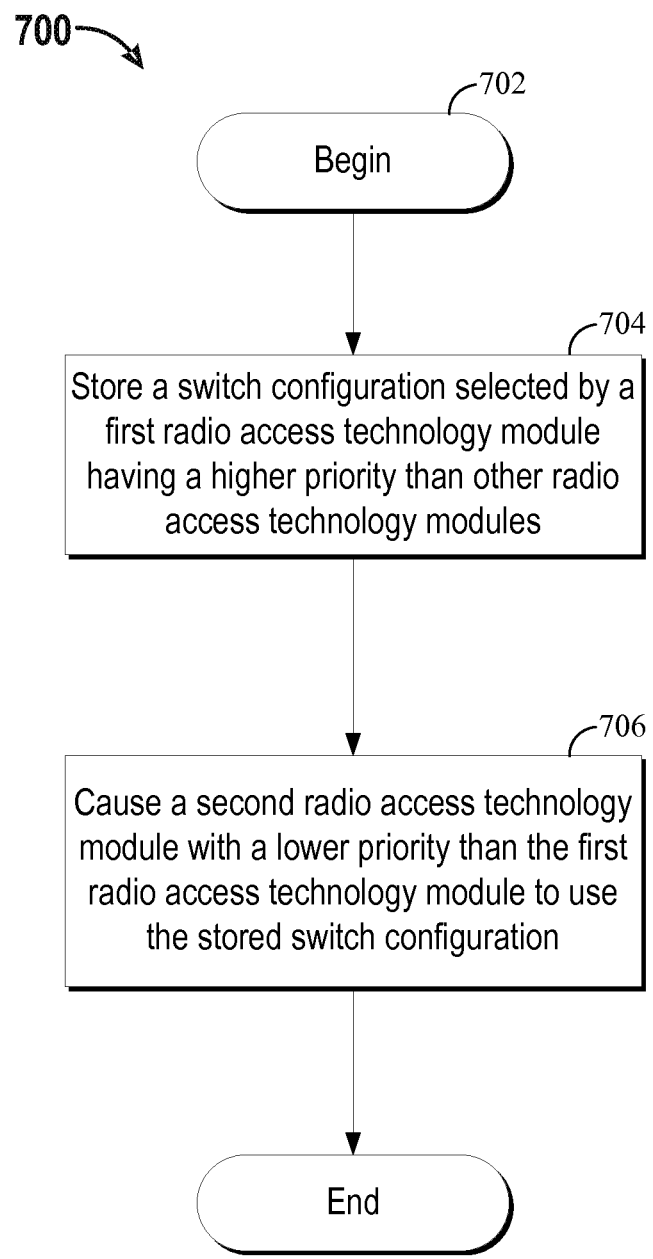
FIG. 7 is a flowchart of an exemplary method for using a common antenna switching manager to manage switch configurations for radio access technology modules with different priorities, in accordance with some embodiments.

FIG. 7 is a flowchart of an exemplary method 700 for using a common antenna switching manager 322 to manage switch configurations for RAT modules 302 with different priorities, in accordance with an embodiment. The method 700 begins at block 702 where multiple RAT modules 302 of the access terminal 106 are concurrently operating. At block 704, the antenna switching manager 322 stores a switch configuration selected by a first RAT module 302a having a higher priority than other RAT modules 302. At block 706, the antenna switching manager 322 causes a second RAT module 302b with a lower priority than the first RAT module 302a to use the stored switch configuration 706 such that both RAT modules 302a and 302b use the same switch configuration during their reception/transmission activities.

In another embodiment, the antenna switching manager 322 may collect performance metrics from each of the RAT modules 302. The performance metrics may correspond to a wide variety of different performance metrics (that may be individual to the RAT type) and may include, for example, Ec/Io, received signal strength indication (RSSI), received signal code power (RSCP), reference signal received power (RSRP), block error rate (BLER), bit error rate (BER), throughput, a missed page indicator, transmit power level, transmit power level headroom, and the like. The antenna switching manager 322 uses this information and determines a switch configuration based on the performance metrics. For example, the antenna switching manager 322 may determine the switch configuration based on the performance metrics to achieve a performance target for one or multiple RAT modules 302. The performance target could correspond to a success or failure indication, some measurement compared to a threshold, or some other measure of performance. The performance target may correspond to achieving a performance target for a higher priority RAT module 302a while performance considerations for other lower priority RAT modules 302b are given less weight. In this way, a centralized switching decision may be made by the antenna switching manager 322 to trade-off performance requirements of different RAT modules 302. In addition, in some cases it may be difficult to directly measure antenna performance. The performance of the antennas 370a, 370b, and 370n may be determined indirectly by the performance metrics of the RAT modules 302. As such, the antenna switching manager 322 may be able to determine overall antenna performance based on measurements from all the RAT modules 302 to determine an improved switch configuration based on which antennas 370a, 370b, and 370n are determined to have better performance.

Figure 8:
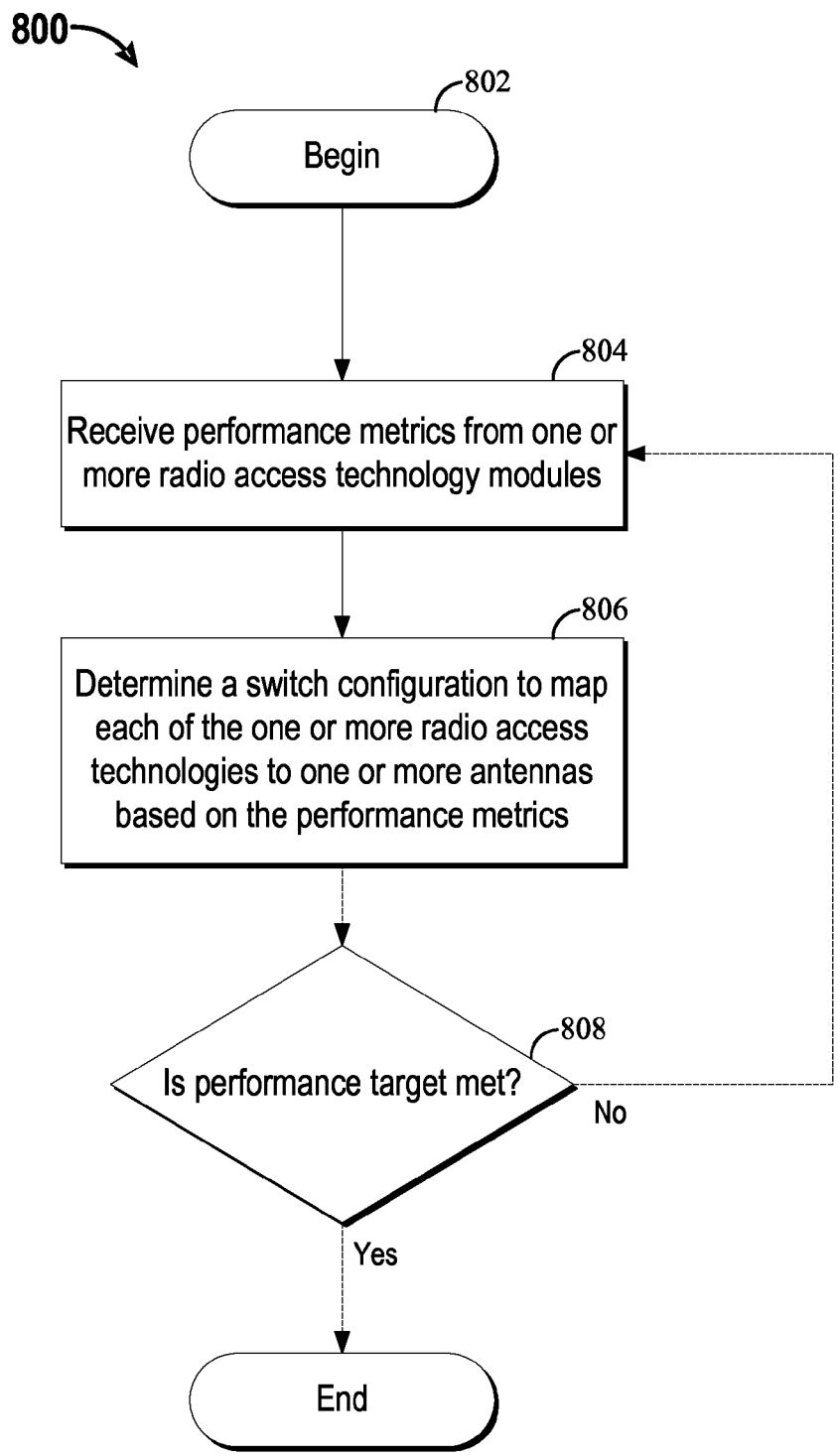
FIG. 8 is a flowchart of an exemplary method for using a common antenna switching manager to manage switch configurations for radio access technology modules based on radio access technology module performance metrics, in accordance with some embodiments.

FIG. 8 is a flowchart of an exemplary method 800 for using a common antenna switching manager 322 to manage switch configurations for RAT modules 302 based on RAT module performance metrics, in accordance with an embodiment. The method 800 begins at block 802 where the antenna switching manager 322 determines to potentially adjust a switch configuration for one or more of the RAT modules 302. At block 802, the antenna switching manager 322 receives performance metrics from one or more RAT modules 302. The performance metrics may correspond to any of the performance metrics described above and may be specific to individual RAT modules 302. At block 806, the antenna switching manager 322 determines a switch configuration to map each of the one or more RAT modules 302 to one or more antennas 370a, 370b, and 370n based on the performance metrics. In some embodiments, the antenna switching manager 322 may further try to maintain a performance target. As such, at decision block 808, the antenna switching manager 322 may determine whether a performance target is met after the switch configuration adjustment is made. If the performance target is not met then the antenna switching manager 322 may optionally gather additional performance metrics and re-determines the switch configuration until the performance target is met.

In another embodiment, the antenna switching manager 322, in response to a change in a switch configuration for one or more RAT modules 302, sends data to each of the RAT modules 302 with information to adjust transmit and receive circuitry in response to the change. In this way, the antenna switching manager 322 coordinates the switching in time among different RAT modules 302. Each RAT module 302 may be able to adjust communication circuitry characteristics in response to the change in switch configuration. In contrast, in the absence of the antenna switching manager 322, a change in switch configuration made by one RAT module 302a could disrupt and cause poor performance for another RAT module 302b if the RAT module 302b does not make changes based one the switch. For example, if a RAT module 302a switches to an antenna 370a currently used by another RAT module 302b, either of the RAT modules 302a or 302b could re-adjust the low noise amplifier (LNA) gain state or the channel estimate, etc., to avoid degradation of performance of the other RAT modules 302a or 302b. In accordance, the antenna switching manager 322 provides information to allow each RAT module 302a and 302b to adjust characteristics such that each RAT modules 302a and 302b may successfully co-exist via shared antennas 370a, 370b, and 370n.

Figure 9:
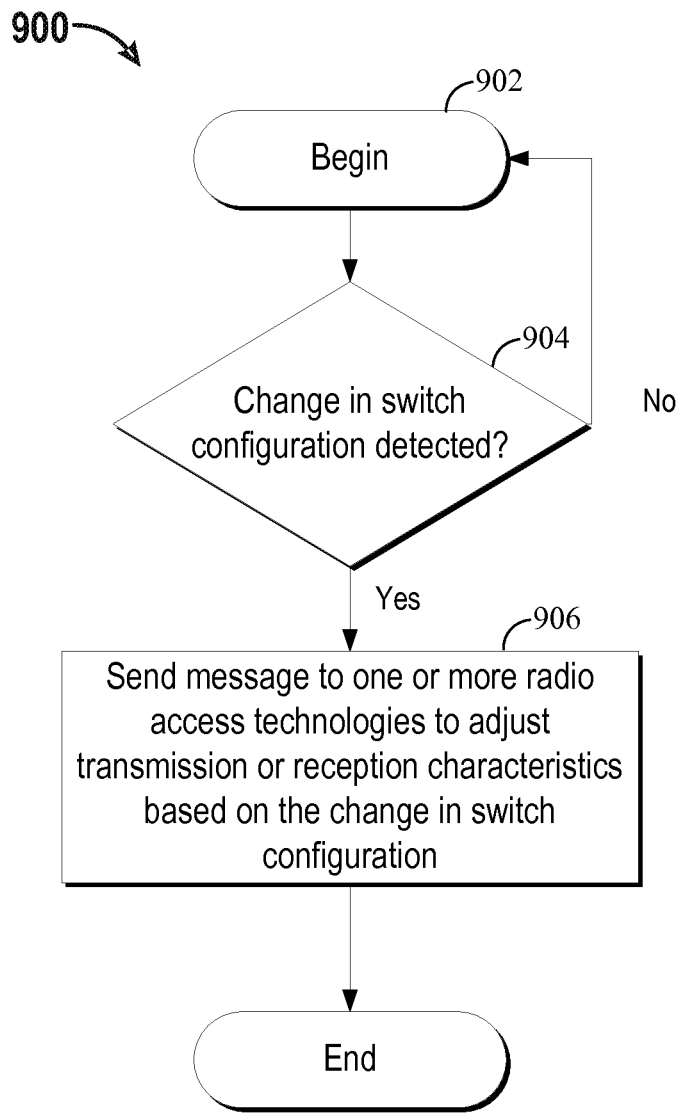
FIG. 9 is a flowchart of an exemplary method for using a common antenna switching manager to manage switch configurations for different radio access technology modules, in accordance with some embodiments.

FIG. 9 is a flowchart of an exemplary method 900 for using a common antenna switching manager 322 to manage switch configurations for different RAT modules 302, in accordance with an embodiment. The method begins at block 902 where multiple RAT modules 302 may be operating concurrently in the access terminal 106. At decision block 904, the antenna switching manager 322 determines whether a change in a switch configuration for one or more RAT modules 302 is detected. If a change is detected, at block 906, the antenna switching manager 322 sends a message to one or more RAT modules 302 to adjust transmission or reception characteristics based on the change in the switch configuration. In this way, coordination in time between the RAT modules 302 is provided in response to a change in switch configuration.

In another embodiment, the antenna switching manager 322 broadcasts availability of the antennas 370a, 370b, and 370n or other status information regarding the antennas 370a, 370b, and 370n to the RAT modules 302. Based on this information, the RAT modules 302 may determine performance metrics for the newly available antennas 370a, 370b, or 370n and compare these metrics with the currently assigned antennas 370a, 370b, and 370n. Based on the comparison, the RAT modules 302 can determine a new switch configuration or request a new switch configuration based on newly available antennas 370a, 370b, and 370n to meet different performance metrics or thresholds. The antenna switching manager 322 may monitor the availability of the antennas 370a, 370b, and 370n, and then each RAT modules 302 is able to have the opportunity to compare between different antennas 370a, 370b, and 370n.

Figure 10:
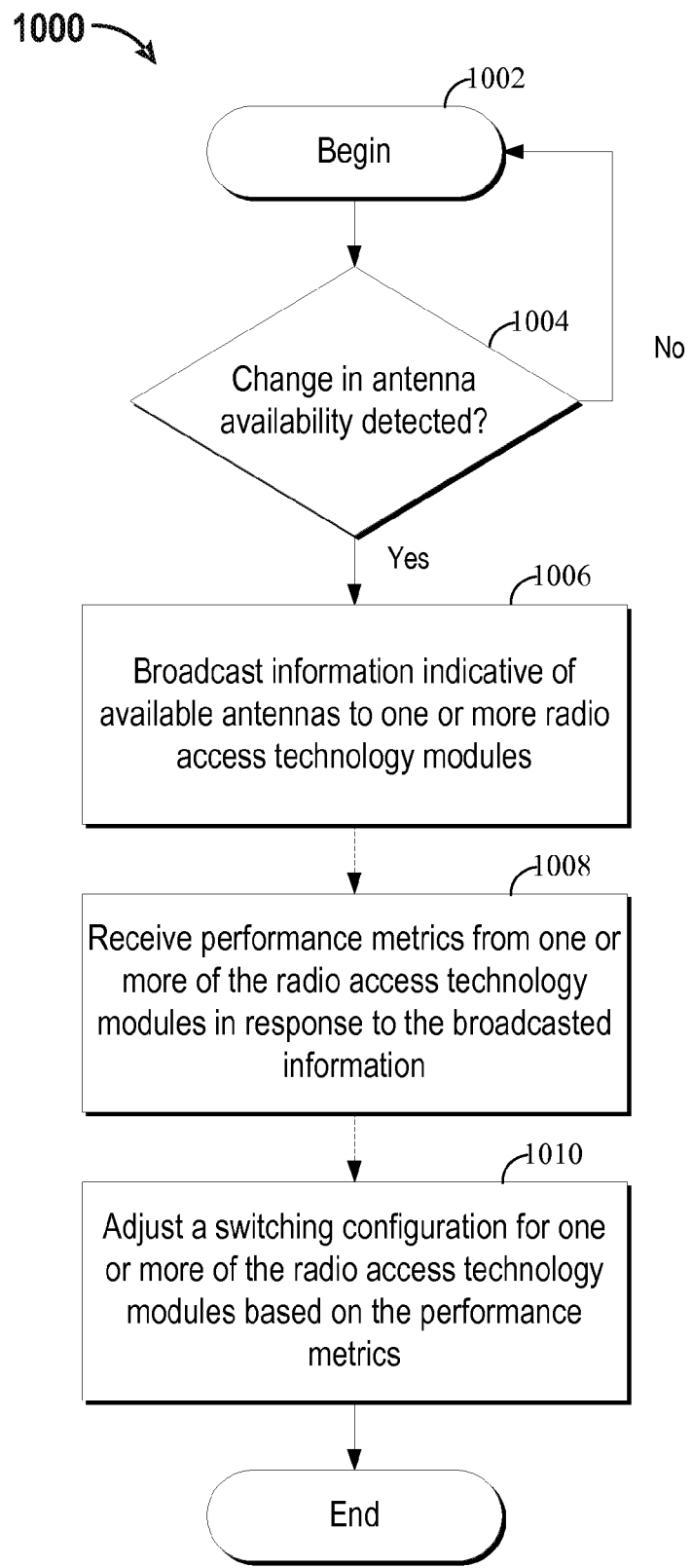
FIG. 10 is a flowchart of an exemplary method for using a common antenna switching manager to manage switch configurations for different radio access technology modules, in accordance with some embodiments.

FIG. 10 is a flowchart of an exemplary method 1000 for using a common antenna switching manager 322 to manage switch configurations for different RAT modules 302, in accordance with an embodiment. The method 1000 begins at block 1002 where one or more RAT modules 302 may be operating in an access terminal 106. At block 1004, the antenna switching manager 322 detects if there is a change in antenna availability. For example, the antenna switching manager 322 may detect that one of the antennas 370a, 370b, and 370n becomes unblocked or that a RAT module 302a is no longer using an antenna 370a, 370b, or 370n. At block 1006, the antenna switching manager 322 sends messages to one or more RAT modules 302 to broadcast information indicative of the available antennas 370a, 370b, and 370n. This information may be used by the RAT modules 302 to compare performance metrics and request or determine a change in the current switch configuration based on newly available antennas 370a, 370b, and 370n. Optionally, in an embodiment, at block 1008 the antenna switching manager 322 may receive performance metrics from the one or more RAT modules 302 in response to the broadcasted information. At block 1010, the antenna switching manager 322 may adjust the switch configuration for one or more of the RAT modules 302 based on the performance metrics 1010.

In another embodiment, the antenna switching manager 322 further acts to prevent one RAT modules 302a from causing interference to one or more other RAT modules 302. With multiple RAT modules 302 and multiple switches, sharing switches that carry signals to different RAT modules 302 may result in interference in some cases. The antenna switching manager 322 dynamically adjusts switch configurations so that the received and transmitted signals of the RAT modules 302 are routed to improve performance of individual RAT modules 302 and/or reduce interference/interruption to the received and transmitted signals of different RAT modules 302 operating concurrently. For example, in an embodiment, the antenna switching manager 322 adjusts the switch configuration so that the transmit signal of one RAT module 302a does not go through the same switch as a receive signal of another RAT module 302b.

Figure 11A:
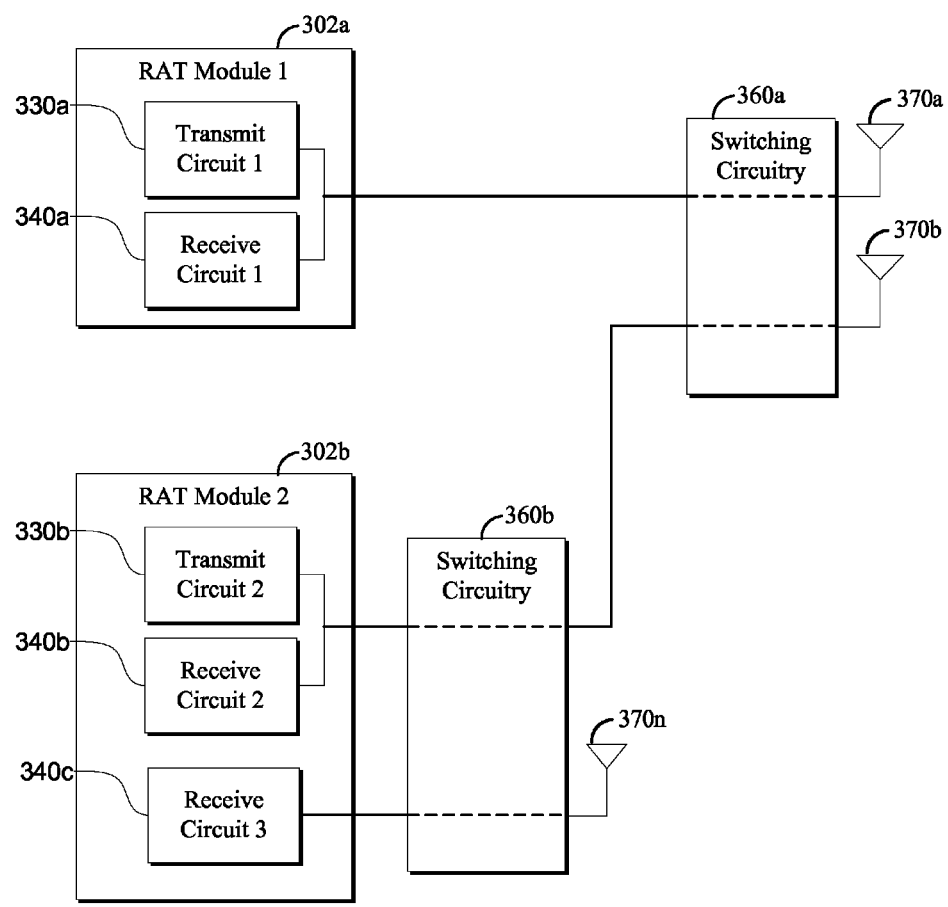
FIGS. 11A and 11B are functional block diagrams illustrating an embodiment for adjusting a switch configuration to prevent interference, in accordance with some embodiments.
Figure 11B:
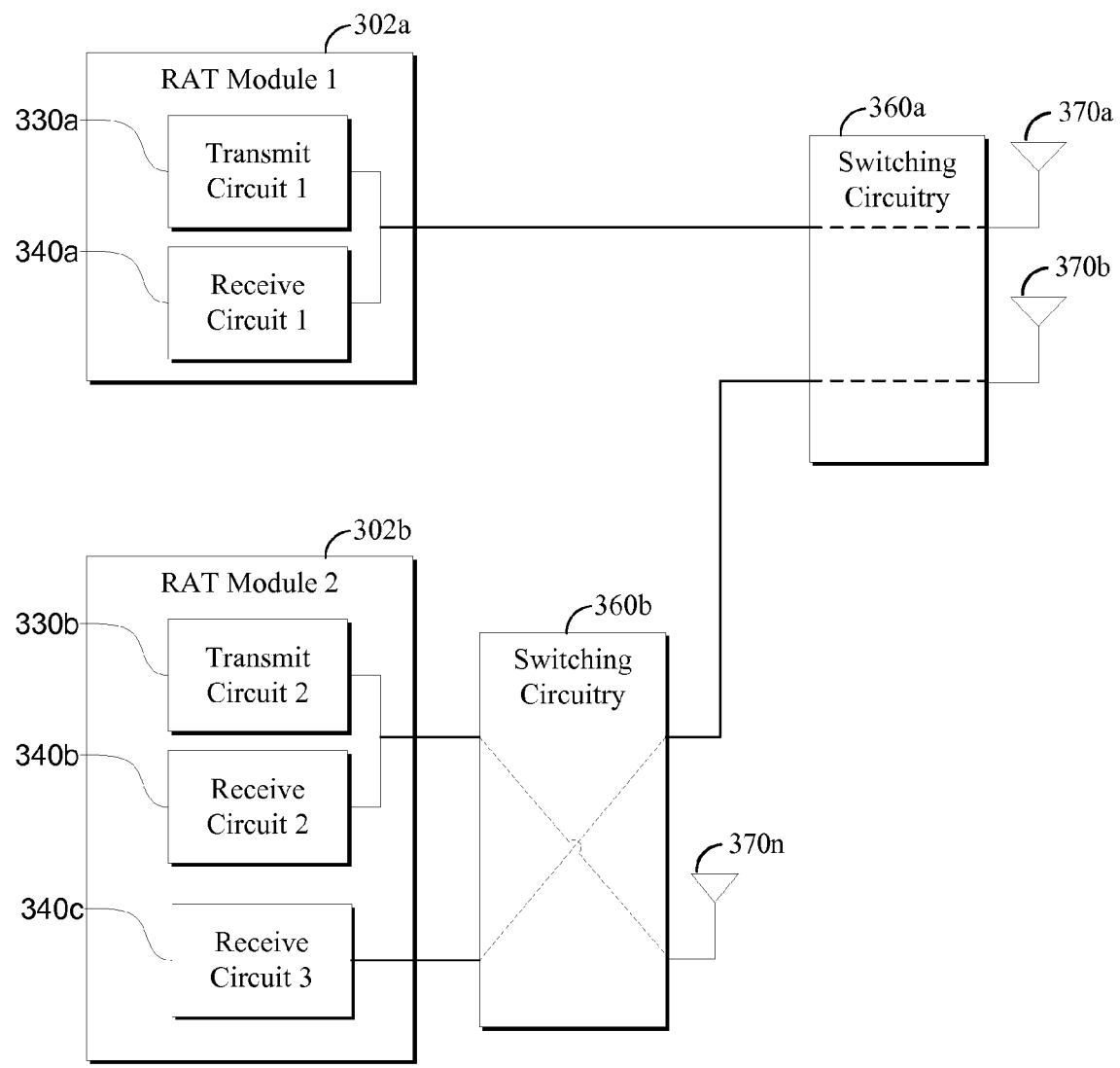

FIGS. 11A and 11B are functional block diagrams illustrating an embodiment for adjusting a switch configuration to prevent interference, in accordance with an embodiment. FIG. 11A shows two RAT modules 302a and 302b. As described above with reference to FIG. 3, the RAT modules 302a and 302b may have transmit and receive circuitry within the RAT modules 302a and 302b in addition to other transmit and receive circuitry. As such, the first RAT module 302a includes a first transmit circuit 330a and a first receive circuit 340a. The second RAT module 302b includes a second transmit circuit 330b and a second receive circuit 340b. In addition, the second RAT module 302b may include a third receive circuit 340c. In an embodiment the second receive circuit 340b and the third receive circuit 340c are configured to simultaneously receive a signal for improving the robustness of successfully demodulating received signals. The RAT modules 302a and 302b are selectively coupled to antennas 370a, 370b, and 370n via switching circuitry 360a and 360b. While shown as separate elements for purposes of illustration, in some embodiments, the switching circuitry 360 may be a single switching circuit 360 (FIG. 3) or a combination of switching circuits. As shown, the first transmit and receive circuits 330a and 340a are coupled via switching circuitry 360a to antenna 370a. The second transmit and receive circuits 330b and 340b are coupled via switching circuitry 360b and the same switching circuitry 360a to antenna 370b. In this case, both RAT modules 302a and 302b are sharing switching circuitry 360a. The third receive circuit is coupled to the third antenna 370c via switching circuitry 302b.

In some cases, as illustrated in FIG. 11A, interference may arise where the transmit signal of one RAT module 302a goes through the same switch 360a as a receive signal of another RAT module 302b. Each RAT module 302a and 302b may be unaware of the sharing if each autonomously makes switching decisions. As such, in an embodiment, the antenna switching manager 322 detects this condition (and similar types of conditions) and adjusts the switch configuration to prevent the interference. FIG. 11B illustrates the change in switch configuration. As shown, the second transmit and receive circuits 330b and 340b of the second RAT module 302b is switched via switching circuit 360b to use the antenna 370n, and the third receive circuit 340c is coupled to antenna 370b via switching circuitry 360a and 360b. In this way, less interference may result.

Figure 12:
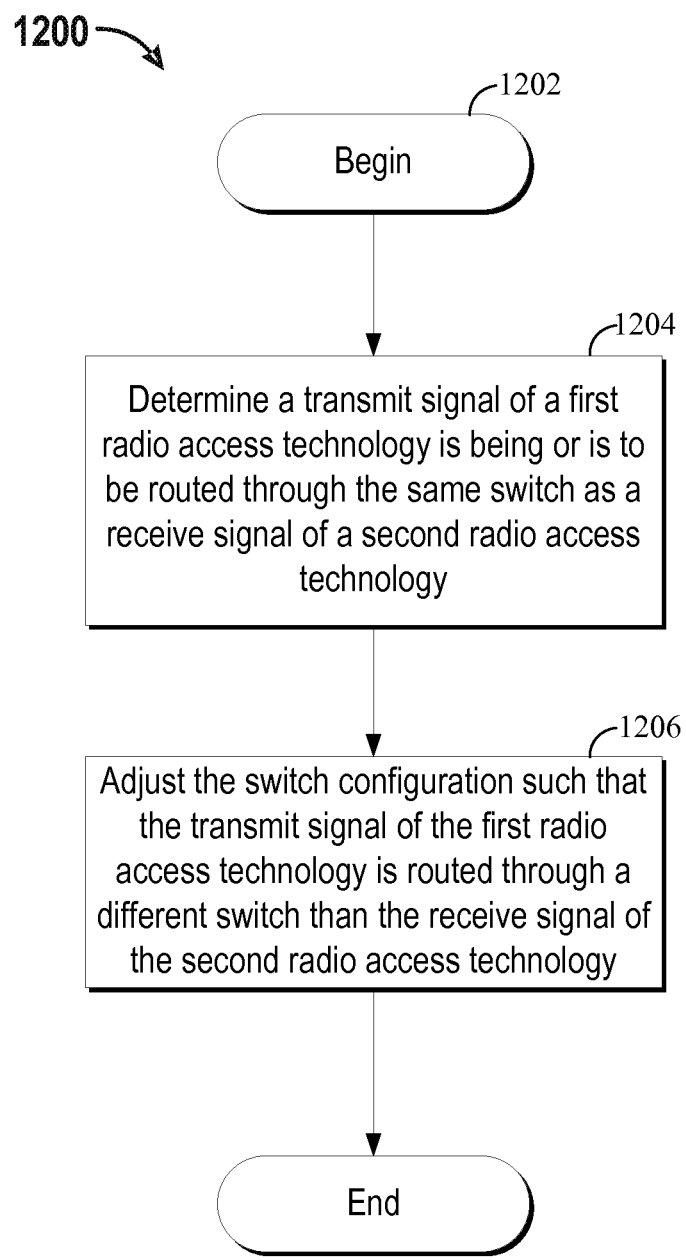
FIG. 12 is a flowchart of an exemplary method for using a common antenna switching manager to manage switch configurations for different radio access technology modules to prevent interference, in accordance with some embodiments.

FIG. 12 is a flowchart of an exemplary method 1200 for using a common antenna switching manager 322 to manage switch configurations for different RAT modules 302 to prevent interference, in accordance with an embodiment. The method 1200 begins at block 1202 where multiple RAT modules 302 may be operating concurrently in an access terminal 106. At block 1204, the antenna switching manager 322 determines that a transmit signal of a first RAT module 302a is being or is to be routed through the same switch as a receive signal of a second RAT module 302b. At block 1206, the antenna switching manager 322 adjusts the switch configuration such that the transmit signal of the first RAT module 302a is routed through a different switch than the receive signal of the second RAT module 302b.

Figure 13A:
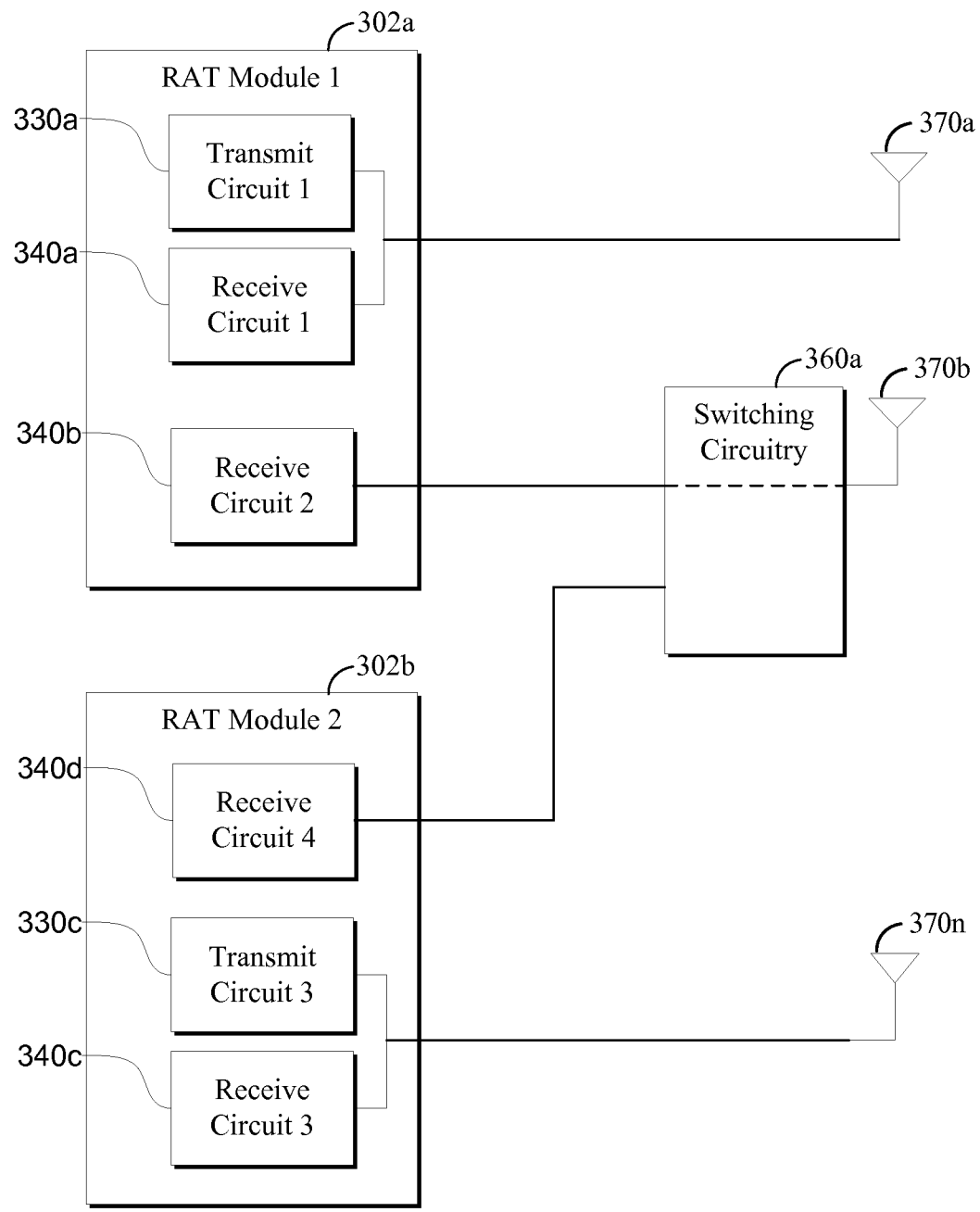
FIGS. 13A and 13B are functional block diagrams illustrating an embodiment for adjusting a switch configuration, in accordance with some embodiments.
Figure 13B:
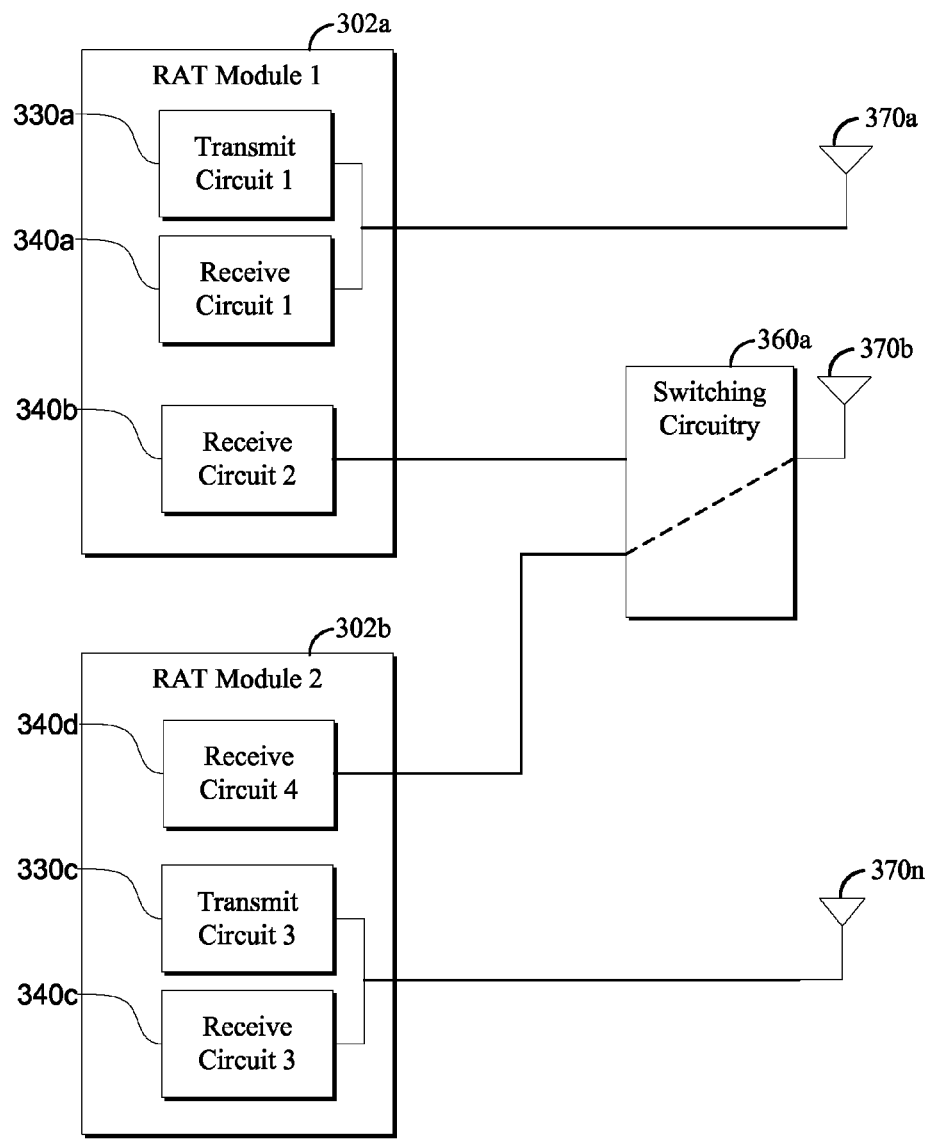

In another embodiment, there may be three antennas 370a, 370b, and 370n shared by two RAT modules 302a and 302b. In an embodiment, one of the antennas 370b may be used by either RAT modules 302a and 302b, one at a time, based on at least one of the priority of each RAT module 302a and 302b, the throughput of each RAT module 302a and 320b, a received signal strength each RAT module 302a and 320b, or based on maintaining a communication link alive. For example, FIGS. 13A and 13B are functional block diagrams illustrating an embodiment for adjusting a switch configuration, in accordance with an embodiment. FIG. 13A shows two RAT modules 302a and 302b. As described above with reference to FIG. 3, the RAT modules 302a and 302b may have transmit and receive circuitry within the RAT modules 302a and 302b in addition to other transmit and receive circuitry. As such, the first RAT module 302a includes a first transmit circuit 330a and a first receive circuit 340a. The first RAT module 302a may further include a second receive circuit 340b. The second RAT module 302b includes a third transmit circuit 330c and a third receive circuit 340c. In addition, the second RAT module 302b may include a fourth receive circuit 340d. The RAT modules 302a and 302b are selectively coupled to antennas 370a, 370b, and 370n via switching circuitry 360a. The switching circuitry 360 may be a portion of the signal switching circuit 360 (FIG. 3). As shown, the first and second RAT modules 302a and 302b share the antenna 370b via the switching circuitry 360a. A method is provided where the switching circuitry 360a is be configured to switch the antenna 370b between the RAT modules 302a and 302b selectively based on some characteristic. For example, the characteristic may be the priority of the RAT modules 302a and 302b, the throughput of the RAT modules 302a and 302b, a received signal strength of the RAT modules 302a and 302b, for maintaining a communication link alive, or the like. For example, when the priority of the first RAT module 302a is higher than the priority of the second RAT module 302b, then an antenna switching manager 322 is configured to cause the switching circuitry 360a to couple the first RAT module 302a to the antenna 370b and vice versa. FIG. 13B shows the same configuration as FIG. 13A, but where the second RAT module 302b is coupled to use the antenna 370b.

In another embodiment, the antenna switching manager 322 makes a three-or-more-way antenna performance comparison to decide an optimal switch configuration according to the priority of each of the RAT modules 302. The antenna switching manager 322 is configured to iterate through various possible switch configurations to obtain performance metrics for each switch configuration. Based on the performance metrics, the antenna switching manager 322 determines the switch configuration defining the mapping the RAT modules 320 to one or more antennas that corresponds to the best performance. The switch configuration determined may be based on the priorities of the RAT modules 302 to allow the RAT module 302a with the highest priority to be coupled to a best performing antenna/switch combination. For example, the antenna switching manager 322 may be configured to receive performance metrics for a switch configuration that provides a comparison between a first antenna 370a and a second antenna 370b. The antenna switching manager 322 may then be configured to change switch configurations to be able to receive performance metrics for a switch configuration that provides a comparison between the second antenna 370b and a third antenna 370n. Based on these metrics, the antenna switching manager 322 is configured to determine a relative ranking of the performance of the three antennas 370a, 370b, and 370n (even while in some embodiments no direct comparison between the first antenna 370a and the third antenna 370n is performed). Based on the information indicating the performances of the antennas 370a, 370b, and 370n, the antenna switching manager 322 may be able to re-configure the switch configurations based on the performance of the antennas 370a, 370b, and 370n (e.g., provide a mapping between a high priority RAT module 302a and the best performing antenna 370a).

Figure 14:
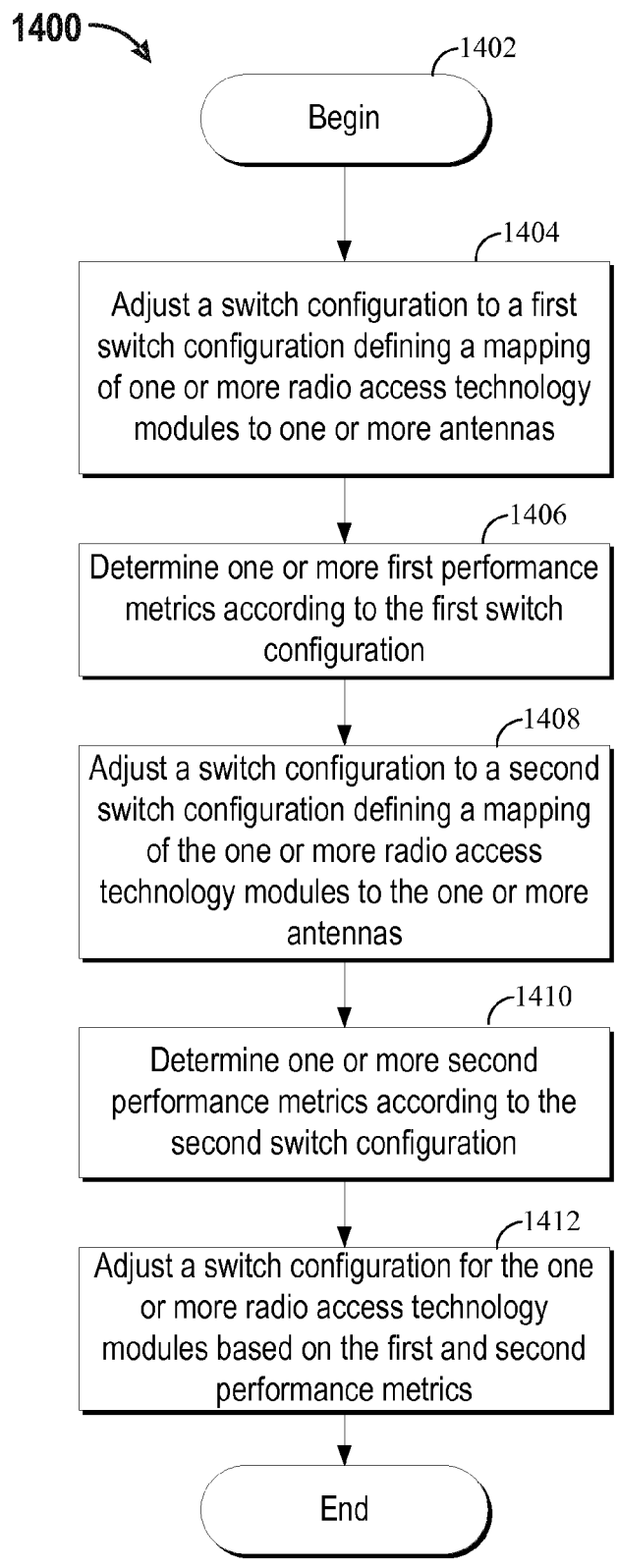
FIG. 14 is a flowchart of an exemplary method for using a common antenna switching manager to manage switch configurations for different radio access technology modules, in accordance with some embodiments.

FIG. 14 is a flowchart of an exemplary method 1400 for using a common antenna switching manager 322 to manage switch configurations for different RAT modules 302, in accordance with an embodiment. The method 1400 begins where multiple RAT modules 302 are operating concurrently in an access terminal 106. At block 1404, the antenna switching manager 322 adjusts a switch configuration to a first switch configuration defining a mapping of one or more RAT modules 302 to one or more antennas 370a, 370b, and 370n. At block 1406, the antenna switching manager 322 determines one or more first performance metrics of the antennas 370a, 370b, or 370n according to the first switch configuration 1406. The performance metrics may be obtained from the RAT modules 302. At block 1408, the antenna switching manager 322 adjusts a switch configuration to a second switch configuration defining a mapping of the one or more RAT modules 302 to the one or more antennas 370a, 370b, and 370n. The second switch configuration is different than the first switch configuration. At block 1410, the antenna switching manager 322 determines one or more second performance metrics of the antennas 370a, 370b, or 370n according to the second switch configuration. The functions in blocks 1404 through 1408 may be repeated for other different switch configurations. At block 1412, the antenna switching manager 322 adjusts a switch configuration for the one or more RAT modules 302 based on the first and the second performance metrics. The adjustment may be based on the priorities of the RAT modules 302 such that higher priority RAT modules 302 are assigned to antennas with better measured performance.

As such, the antenna switching manager 322 may provide various functions and operations for arbitrating switch configuration decisions between RAT modules 302. In an aspect, where RAT module switching requests are in conflict, the antenna switching manager 322 determines the final switch configuration between the RATs to resolve conflicts and handle switching requests based on different RAT priorities and to reduce interference. Managing the switch configuration between multiple RAT modules 302 allows for eliminating problems where each RAT module 302 would autonomously make switch configurations to the potential detriment of performance of other RAT modules 302.

The embodiments described herein may be applicable to WCDMA, 1x/EvDo, GSM, LTE, and the like.

Figure 15:
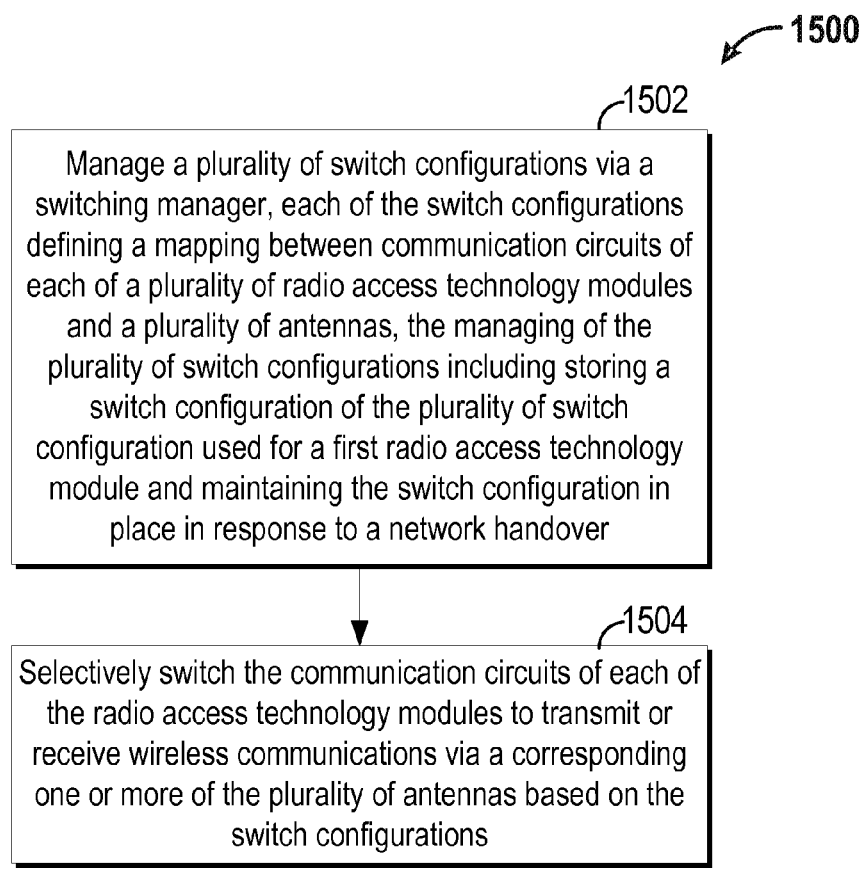
FIG. 15 is a flowchart of an exemplary method for wireless communication via a plurality of radio access technology modules, in accordance with some embodiments.

FIG. 15 is a flowchart of an exemplary method 1500 for wireless communication via a plurality of RAT modules 303, in accordance with an embodiment. Each of the plurality of RAT modules 302 is configured to communicate according to a different radio access technology. The method 1500 may be implemented at a wireless communications apparatus implemented as an access terminal 106 as described with reference to FIG. 3, for example. Although the method 1500 is described below with respect to elements of the access terminal 106, those having ordinary skill in the art will appreciate that other components may be used to implement one or more of the blocks described herein.

At block 1502, a plurality of switch configurations are managed via an antenna switching manager 322. Each of the switch configurations define a mapping between communication circuits 330 and 340 of each of a plurality of RAT module 302 and a plurality of antennas 370a, 370b, and 370n. Managing the plurality of switch configurations may include storing a switch configuration of the plurality of switch configurations used for a first radio access technology module and maintaining the switch configuration in place in response to a network handover. At block 1502, the communication circuits 330 and 340 of each of the RAT modules 302 are selectively switched to transmit or receive wireless communications via a corresponding one or more of the plurality of antennas 370a, 370b, and 370n based on the switch configurations.

Figure 16:
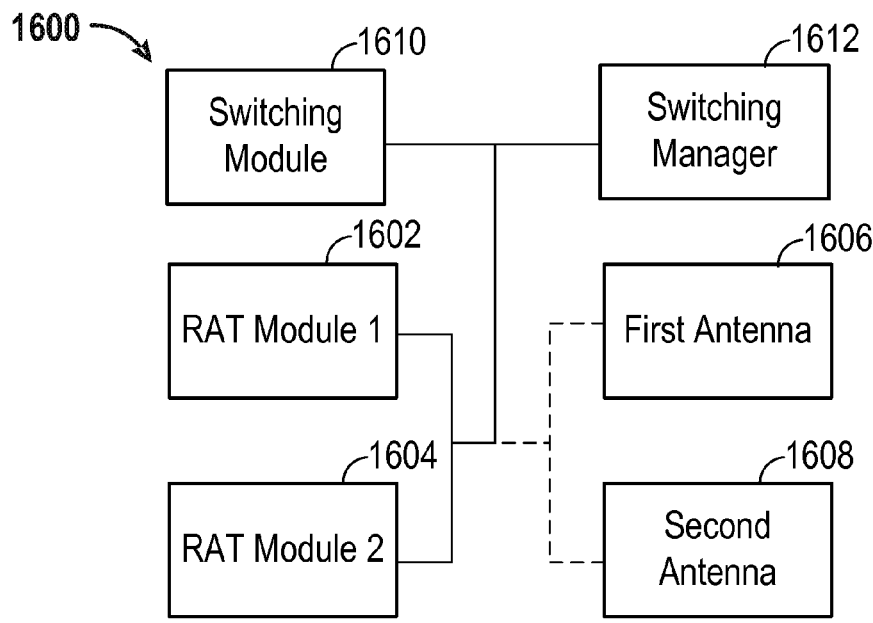
FIG. 16 is a functional block diagram of another exemplary wireless communications apparatus that may be employed within the wireless communication system in accordance with some embodiments.

FIG. 16 is a functional block diagram of another exemplary wireless communications apparatus 1600 that may be employed within the wireless communication system 100 in accordance with some embodiments. Those skilled in the art will appreciate that a wireless communication device 1600 may have more components, such as any one or more of the components shown in FIG. 3. The wireless communication device 1600 shown includes only those components useful for describing some prominent features of certain embodiments. The device 1600 includes a first RAT module 1602 and second RAT module 1604. In some cases, a means for preparing and processing signals for wireless communications according to different radio access technologies may include the first or second RAT modules 1602 and 1604. The first and second RAT modules may include one or more controllers 306 (FIG. 3). The device 1600 further includes a first antenna 1606 and second antenna 1608. The first antenna 1606 may include a first means for transmitting or receiving signals. The second antenna 1608 may include a second means for transmitting or receiving signals. The device 1600 further includes a switching manager 1612. The switching manager 1612 may be configured to perform one or more of the functions described above with respect to block 1502 of FIG. 15. In some cases a means for managing switch configurations may include the switching manager 1612. The switching manager 1612 may include a controller 320 or other circuitry and functionality corresponding to the antenna switching manager 322 described above. The device 1600 further includes a switching module 1610. The switching module 1610 may be configured to perform one or more of the functions described above with respect to block 1504 of FIG. 15. In some cases, a means for selectively switching may include the switching module 1610. The switching module may include the controller 320 and may include switching circuitry 360.

If implemented in software, the functions may be stored on or transmitted over as one or more instructions or code on a computer-readable medium. The steps of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Figure 17:
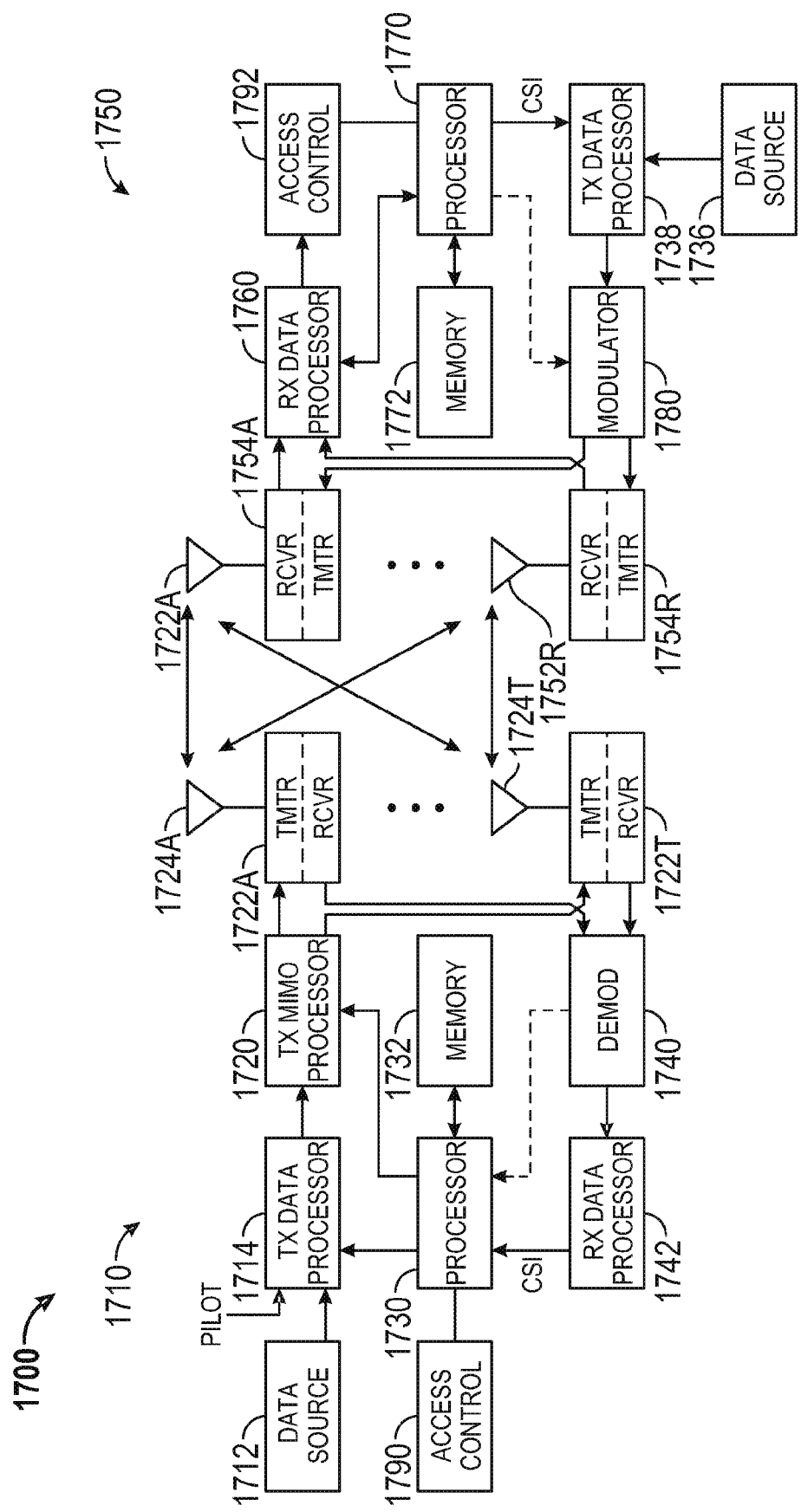
FIG. 17 shows an example of a functional block diagram of various components in a communication system in accordance with some embodiments.

Furthermore, as indicated by the systems and methods described above, the teachings herein may be incorporated into a node (e.g., a device) employing various components for communicating with at least one other node. FIG. 17 depicts several sample components that may be employed to facilitate communication between nodes in accordance with some embodiments. Specifically, FIG. 17 is a simplified block diagram of a first wireless device 1710 (e.g., an access point) and a second wireless device 1750 (e.g., an access terminal) of a multiple-in-multiple-out (MIMO) system 1700. At the first device 1710, traffic data for a number of data streams is provided from a data source 1712 to a transmit (TX) data processor 1714.

In some aspects, each data stream is transmitted over a respective transmit antenna. The TX data processor 1714 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 1730. A data memory 1732 may store program code, data, and other information used by the processor 1730 or other components of the device 1710.

The modulation symbols for all data streams are then provided to a TX MIMO processor 1720, which may further process the modulation symbols (e.g., for OFDM). The TX MIMO processor 1720 then provides $N_T$ modulation symbol streams to $N_T$ transceivers (XCVR) 1722A through 1722T. In some aspects, the TX MIMO processor 1720 applies beamforming weights to the symbols of the data streams and to the antenna from which the symbol is being transmitted.

Each transceiver 1722 receives and processes a respective symbol stream to provide one or more analog signals, and further conditions (e.g., amplifies, filters, and up converts) the analog signals to provide a modulated signal suitable for transmission over the MIMO channel. $N_T$ modulated signals from transceivers 1722A through 1722T are then transmitted from $N_T$ antennas 1724A through 1724T, respectively.

At the second device 1750, the transmitted modulated signals are received by $N_R$ antennas 1752A through 1752R and the received signal from each antenna 1752 is provided to a respective transceiver (XCVR) 1754A through 1754R. Each transceiver 1754 conditions (e.g., filters, amplifies, and down converts) a respective received signal, digitizes the conditioned signal to provide samples, and further processes the samples to provide a corresponding "received" symbol stream.

A receive (RX) data processor 1760 then receives and processes the $N_R$ received symbol streams from $N_R$ transceivers 1754 based on a particular receiver processing technique to provide $N_T$ "detected" symbol streams. The RX data processor 1760 then demodulates, deinterleaves, and decodes each detected symbol stream to recover the traffic data for the data stream. The processing by the RX data processor 1760 is complementary to that performed by the TX MIMO processor 1720 and the TX data processor 1714 at the device 1710.

A processor 1770 periodically determines which pre-coding matrix to use (discussed below). The processor 1770 formulates a reverse link message comprising a matrix index portion and a rank value portion. A data memory 1772 may store program code, data, and other information used by the processor 1770 or other components of the second device 1750.

The reverse link message may comprise various types of information regarding the communication link and/or the received data stream. The reverse link message is then processed by a TX data processor 1738, which also receives traffic data for a number of data streams from a data source 1736, modulated by a modulator 1780, conditioned by the transceivers 1754A through 1754R, and transmitted back to the device 1710.

At the device 1710, the modulated signals from the second device 1750 are received by the antennas 1724, conditioned by the transceivers 1722, demodulated by a demodulator (DEMOD) 1740, and processed by a RX data processor 1742 to extract the reverse link message transmitted by the second device 1750. The processor 1730 then determines which precoding matrix to use for determining the beam-forming weights then processes the extracted message.

FIG. 17 also illustrates that the communication components may include one or more components that perform access control operations as taught herein. For example, an access control component 1790 may cooperate with the processor 1730 and/or other components of the device 1710 to send/receive signals to/from another device (e.g., device 1750) as taught herein. Similarly, an access control component 1792 may cooperate with the processor 1770 and/or other components of the device 1750 to send/receive signals to/from another device (e.g., device 1710). It should be appreciated that for each device 1710 and 1750 the functionality of two or more of the described components may be provided by a single component. For example, a single processing component may provide the functionality of the access control component 1790 and the processor 1730 and a single processing component may provide the functionality of the access control component 1792 and the processor 1770. Furthermore, the components of the apparatus 1700 described with reference to FIG. 3 may be incorporated with/into the components of FIG. 17.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may include one or more elements.

A person/one having ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

A person/one having ordinary skill in the art would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein and in connection with FIGS. 1-17 may be implemented within or performed by an integrated circuit (IC), an access terminal, or an access point. The IC may include a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. The logical blocks, modules, and circuits may include antennas and/or transceivers to communicate with various components within the network or within the device. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The functionality of the modules may be implemented in some other manner as taught herein. The functionality described herein (e.g., with regard to one or more of the accompanying figures) may correspond in some aspects to similarly designated "means for" functionality in the appended claims.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Various modifications to the embodiments described in this disclosure may be readily apparent to those skilled in the art, and the generic principles defined herein may be applied to other embodiments without departing from the spirit or scope of this disclosure. Thus, the disclosure is not intended to be limited to the embodiments shown herein, but is to be accorded the widest scope consistent with the claims, the principles and the novel features disclosed herein. The word "exemplary" is used exclusively herein to mean "serving as an example, instance, or illustration." Any embodiment described herein as "exemplary" is not necessarily to be construed as preferred or advantageous over other embodiments.

Certain features that are described in this specification in the context of separate embodiments also can be implemented in combination in a single embodiment. Conversely, various features that are described in the context of a single embodiment also can be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products. Additionally, other embodiments are within the scope of the following claims. In some cases, the actions recited in the claims can be performed in a different order and still achieve desirable results.

What is claimed is:

1. A wireless communications apparatus, comprising:
  a plurality of antennas;
  a plurality of radio access technology modules each configured to wirelessly communicate according to a radio access technology, each of the radio access technology modules comprising one or more communication circuits configured to transmit or receive wireless communications;
  a controller configured to selectively switch communication circuits of each of the radio access technology modules to transmit or receive wireless communications via a corresponding one or more of the plurality of antennas; and
  a switching manager configured to manage a plurality of switch configurations, each of the switch configurations defining a mapping between communications circuits of each of the radio access technology modules and the antennas, the switching manager further configured to:
    store a switch configuration of the plurality of switch configurations used for a first radio access technology module; and
    cause the controller to maintain the switch configuration of the antennas used for the first radio access technology module in place in response to a network handover,
    wherein the network handover is implemented from the first radio access technology module to a second radio access technology module using a different radio access technology than the first radio access technology module and maintaining the switch configuration of the antennas used for the first radio access technology module.

2. The wireless communications apparatus of claim 1, wherein the switching manager is further configured to send information indicative of a change in a switch configuration for a radio access technology module to other radio access technology modules, the information configured to be used by the other radio access technology modules to adjust one or more transmission or reception characteristics based on the changed switch configuration.

3. The wireless communications apparatus of claim 1, wherein the switching manager is configured to:
  store a switch configuration of the plurality of switch configurations for a radio access technology module having priority over other radio access technology modules; and
  cause the controller to switch the other radio access technology modules to the stored switch configuration of the higher priority radio access technology module.

4. The wireless communications apparatus of claim 1, wherein the switching manager is configured to:
  receive performance metrics from one or more of the plurality of radio access technology modules; and
  determine the switch configurations for the plurality of radio access technology modules based on the collected performance metrics to maintain a performance target.

5. The wireless communications apparatus of claim 1, wherein the switching manager is configured to send a message to the plurality of radio access technology modules to broadcast an availability of one or more of the plurality of antennas.

6. The wireless communications apparatus of claim 5, wherein the switching manager is configured to receive performance metrics from the radio access technology modules based on the message and antenna availability to determine one or more switching configurations.

7. The wireless communications apparatus of claim 1, wherein the switching manager is configured to change a switch configuration such that a transmit signal of a first communication circuit of the first radio access technology module does not go through a same switch as a receive signal of a second communication circuit of the second radio access technology module.

8. The wireless communications apparatus of claim 1, wherein the switching manager is configured to selectively switch between coupling one of the first radio access technology module or the second radio access technology module to a single antenna based on at least one of: which of the first or second radio access technology modules has a higher priority, a throughput of the first or second radio access technology modules, a received signal strength of the first or second radio access technologies, and a communication link state of the first or second radio access technology modules.

9. The wireless communications apparatus of claim 1, wherein the switching manager is configured to switch between different switch configurations and obtain information from the radio access technology modules for each switch configuration of the different switch configurations, and wherein the switching manager is configured to determine one or more switching configurations to use based on the obtained information.

10. The wireless communications apparatus of claim 9, wherein the switching manager is further configured to:
  compare first performance metrics of a first antenna and a second antenna of the plurality of antennas according to a first switch configuration;
  compare second performance metrics of the second antenna and a third antenna according to a second switch configuration;
  determine an antenna performance ranking of the first, second, and third antennas based on the first and second performance metrics; and
  determine a switch configuration to use based on the antenna performance ranking.

11. A method for wireless communication via a plurality of radio access technology modules, each of the plurality of radio access technology modules configured to communicate according to a radio access technology, the method comprising:
  managing a plurality of switch configurations via a switching manager, each of the switch configurations defining a mapping between communication circuits of each of the plurality of radio access technology modules and a plurality of antennas, wherein managing the plurality of switch configurations comprises:
    storing a switch configuration of the plurality of switch configurations used for a first radio access technology module;
    maintaining the switch configuration of the antennas used for the first radio access technology module in place in response to a network handover wherein the network handover is implemented from the first radio access technology module to a second radio access technology module using a different radio access technology than the first radio access technology module and maintaining the switch configuration of the antennas used for the first radio access technology module; and selectively switching the communication circuits of each of the radio access technology modules to transmit or receive wireless communications via a corresponding one or more of the plurality of antennas based on the switch configurations.

12. The method of claim 11, further comprising sending, via the switching manager, information indicative of a change in a switch configuration for a radio access technology module to other radio access technology modules, the information configured to be used by the other radio access technology modules to adjust one or more transmission or reception characteristics based on the changed switch configuration.

13. The method of claim 11, wherein managing the plurality of switch configurations further comprises:

storing a switch configuration of the plurality of switch configurations for a radio access technology module having priority over other radio access technology modules; and switching the other radio access technology modules to the stored switch configuration of the higher priority radio access technology module.

14. The method of claim 11, wherein managing the plurality of switch configurations further comprises:

receiving performance metrics from one or more of the plurality of radio access technology modules; and determining the switch configurations for the plurality of radio access technology modules based on the collected performance metrics to maintain a performance target.

15. The method of claim 11, wherein managing the plurality of switch configurations further comprises sending a message to the plurality of radio access technology modules to broadcast an availability of one or more of the plurality of antennas.

16. The method of claim 15, wherein managing the plurality of switch configurations further comprises receiving performance metrics from the radio access technology modules based on the message and antenna availability to determine one or more switching configurations.

17. The method of claim 11, wherein managing the plurality of switch configurations further comprises changing a switch configuration such that a transmit signal of a first communication circuit of the first radio access technology module does not go through a same switch as a receive signal of a second communication circuit of the second radio access technology module.

18. The method of claim 11, wherein managing the plurality of switch configurations further comprises selectively switching between coupling one of the first radio access technology module or the second radio access technology module to a single antenna based on at least one of: which of the first or second radio access technology modules has a higher priority, a throughput of the first or second radio access technology modules, a received signal strength of the first or second radio access technologies, and a communication link state of the first or second radio access technology modules.

19. The method of claim 11, wherein managing the plurality of switch configurations further comprises switching between different switch configurations and obtaining information from the radio access technology modules for each switch configuration of the different switch configurations, and wherein managing the plurality of switch configurations further comprises determining one or more switching configurations to use based on the obtained information.

20. The method of claim 19, wherein managing the plurality of switch configurations further comprises:

comparing first performance metrics of a first antenna and a second antenna of the plurality of antennas according to a first switch configuration;

comparing second performance metrics of the second antenna and a third antenna according to a second switch configuration;

determining an antenna performance ranking of the first, second, and third antennas based on the first and second performance metrics; and determining a switch configuration to use based on the antenna performance ranking.

21. A wireless communications apparatus, comprising:

a plurality of means for transmitting or receiving signals;

a plurality of radio access technology modules, each configured to wirelessly communicate according to a radio access technology;

means for selectively switching each of the plurality of radio access technology modules to transmit or receive wireless communications via a corresponding one or more of the means for transmitting or receiving signals; and means for managing a plurality of switch configurations, each of the switch configurations defining a mapping between each of the plurality of radio access technology modules and the means for transmitting or receiving signals, the means for managing the plurality of switch configurations further comprising:

means for storing a switch configuration of the plurality of switch configurations used for a first radio access technology module; and means for maintaining the switch configuration of the antennas used for the first radio access technology module in place in response to a network handover, wherein the network handover is implemented from the first radio access technology module to a second radio access technology module using a different radio access technology than the first radio access technology module and maintaining the switch configuration of the antennas used for the first radio access technology module.

22. The wireless communications apparatus of claim 21, wherein the means for managing the plurality of switch configurations further comprises means for sending information indicative of a change in a switch configuration for a first radio access technology module to other radio access technology modules, the information configured to be used by the other radio access technology modules to adjust one or more transmission or reception characteristics based on the changed switch configuration.

23. The wireless communications apparatus of claim 21, wherein the means for managing the plurality of switch configurations further comprises:

means for storing a switch configuration of the plurality of switch configurations for a radio access technology module having priority over other radio access technology modules; and means for switching the other radio access technology modules to the stored switch configuration of the higher priority radio access technology module.

24. The wireless communications apparatus of claim 21, wherein the means for managing the plurality of switch configurations further comprises:
- means for receiving performance metrics from one or more of the plurality of radio access technology modules; and
- means for determining the switch configurations for the plurality of radio access technology modules based on the collected performance metrics to maintain a performance target.

25. The wireless communications apparatus of claim 21, wherein the means for managing the plurality of switch configurations further comprises means for sending a message to the plurality of radio access technology modules to broadcast an availability of one or more of the plurality of means for transmitting or receiving signals.

26. The wireless communications apparatus of claim 25, wherein the means for managing the plurality of switch configurations further comprises means for receiving performance metrics from the radio access technology modules based on the message to determine one or more switching configurations.

27. The wireless communications apparatus of claim 21, wherein the means for managing the plurality of switch configurations further comprises means for changing a switch configuration such that a transmit signal of the first radio access technology module does not go through a same switch as a receive signal of the second radio access technology module.

28. The wireless communications apparatus of claim 21, wherein the means for managing the plurality of switch configurations further comprises means for selectively switching between coupling one of the first radio access technology module or the second radio access technology module to a single means for transmitting or receiving signals based on at least one of: which of the first or second radio access technology modules has a higher priority, a throughput of the first or second radio access technology modules, a received signal strength of the first or second radio access technologies, and a communication link state of the first or second radio access technology modules.

29. The wireless communications apparatus of claim 21, wherein the means for managing the plurality of switch configurations further comprises means for switching between different switch configurations and means for obtaining information from the radio access technology modules for each switch configuration of the different switch configurations, and wherein the wherein the means for managing the plurality of switch configurations comprises means for determining one or more switching configurations to use based on the obtained information.

30. The wireless communications apparatus of claim 29, wherein the means for managing the plurality of switch configurations further comprises:
- means for comparing first performance metrics of a first means for transmitting or receiving signals and a second means for transmitting or receiving signals of the plurality of means for transmitting or receiving signals according to a first switch configuration;
- means for comparing second performance metrics of the second means for transmitting or receiving signals and a third means for transmitting or receiving signals according to a second switch configuration;
- means for determining a performance ranking of the first, second, and third means for transmitting or receiving signals based on the first and second performance metrics; and
- means for determining a switch configuration to use based on the performance ranking.

31. A computer program product comprising a non-transitory computer readable medium encoded thereon with instructions that when executed cause a wireless communications apparatus to perform a method for wireless communication via a plurality of radio access technology modules, each of the plurality of radio access technology modules configured to communicate according to a radio access technology, the method comprising:
- managing a plurality of switch configurations via a switching manager, each of the switch configurations defining a mapping between communication circuits of each of the plurality of radio access technology modules and a plurality of antennas, wherein managing the plurality of switch configurations comprises:
  - storing a switch configuration of the plurality of switch configurations used for a first radio access technology module;
  - maintaining the switch configuration of the antennas used for the first radio access technology module in place in response to a network handover wherein the network handover is implemented from the first radio access technology module to a second radio access technology module using a different radio access technology than the first radio access technology module and maintaining the switch configuration of the antennas used for the first radio access technology module; and
- selectively switching the communication circuits of each of the radio access technology modules to transmit or receive wireless communications via a corresponding one or more of the plurality of antennas based on the switch configurations.

32. The computer program product of claim 31, the method further comprising sending, via the switching manager, information indicative of a change in a switch configuration for a radio access technology module to other radio access technology modules, the information configured to be used by the other radio access technology modules to adjust one or more transmission or reception characteristics based on the changed switch configuration.

33. The computer program product of claim 31, wherein managing the plurality of switch configurations further comprises:
- storing a switch configuration of the plurality of switch configurations for a radio access technology module having priority over other radio access technology modules; and
- switching the other radio access technology modules to the stored switch configuration of the higher priority radio access technology module.

34. The computer program product of claim 31, wherein managing the plurality of switch configurations further comprises:
- receiving performance metrics from one or more of the plurality of radio access technology modules; and
- determining the switch configurations for the plurality of radio access technology modules based on the collected performance metrics to maintain a performance target.

35. The computer program product of claim 31, wherein managing the plurality of switch configurations further comprises sending a message to the plurality of radio access technology modules to broadcast an availability of one or more of the plurality of antennas.

36. The computer program product of claim 35, wherein managing the plurality of switch configurations further comprises receiving performance metrics from the radio access technology modules based on the message and antenna availability to determine one or more switching configurations.

37. The computer program product of claim 31, wherein managing the plurality of switch configurations further comprises changing a switch configuration such that a transmit signal of a first communication circuit of the first radio access technology module does not go through a same switch as a receive signal of a second communication circuit of the second radio access technology module.

38. The computer program product of claim 31, wherein managing the plurality of switch configurations further comprises selectively switching between coupling one of the first radio access technology module or the second radio access technology module to a single antenna based on at least one of: which of the first or second radio access technology modules has a higher priority, a throughput of the first or second radio access technology modules, a received signal strength of the first or second radio access technologies, and a communication link state of the first or second radio access technology modules.

39. The computer program product of claim 31, wherein managing the plurality of switch configurations further comprises switching between different switch configurations and obtaining information from the radio access technology modules for each switch configuration of the different switch configurations, and wherein managing the plurality of switch configurations further comprises determining one or more switching configurations to use based on the obtained information.

40. The computer program product of claim 39, wherein managing the plurality of switch configurations further comprises:
- comparing first performance metrics of a first antenna and a second antenna of the plurality of antennas according to a first switch configuration;
- comparing second performance metrics of the second antenna and a third antenna according to a second switch configuration;
- determining an antenna performance ranking of the first, second, and third antennas based on the first and second performance metrics; and
- determining a switch configuration to use based on the antenna performance ranking.

\* \* \* \* \*